(12) United States Patent
Takenaka

(10) Patent No.: US 12,158,237 B2
(45) Date of Patent: Dec. 3, 2024

(54) INSERTION AMOUNT GRASPING DEVICE

(71) Applicant: TOYOTA JIDOSHA KABUSHIKI KAISHA, Toyota (JP)

(72) Inventor: Tetsuhiro Takenaka, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 76 days.

(21) Appl. No.: 18/064,226

(22) Filed: Dec. 9, 2022

(65) Prior Publication Data

US 2023/0194048 A1    Jun. 22, 2023

(30) Foreign Application Priority Data

Dec. 16, 2021   (JP) .................................. 2021-204618
Nov. 17, 2022   (JP) .................................. 2022-184163

(51) Int. Cl.
| | |
|---|---|
| *F16N 3/10* | (2006.01) |
| *F16C 33/66* | (2006.01) |
| *F16N 27/00* | (2006.01) |
| *F16D 13/74* | (2006.01) |

(52) U.S. Cl.
CPC ............ *F16N 3/10* (2013.01); *F16C 33/6622* (2013.01); *F16N 27/00* (2013.01); *F16D 13/74* (2013.01)

(58) Field of Classification Search
CPC .................................. B05B 13/06; F16N 3/10
See application file for complete search history.

(56) References Cited

U.S. PATENT DOCUMENTS

| | | | | |
|---|---|---|---|---|
| 5,908,097 | A | * | 6/1999 | Grosspietsch ........ F16D 25/085 192/30 W |
| 5,947,251 | A | * | 9/1999 | Goins ..................... F16D 13/48 192/89.26 |
| 6,088,874 | A | * | 7/2000 | Nakata ....................... F16L 5/10 16/2.2 |
| 6,901,627 | B2 | * | 6/2005 | Uchida ................ H02G 3/0468 16/2.2 |

(Continued)

FOREIGN PATENT DOCUMENTS

| | | |
|---|---|---|
| JP | S617690 U | 1/1986 |
| JP | 2017002934 A | 1/2017 |
| JP | 2020037949 A | 3/2020 |

*Primary Examiner* — Michael A Riegelman
(74) *Attorney, Agent, or Firm* — Hunton Andrews Kurth LLP

(57) ABSTRACT

An insertion amount grasping device includes: a first jig fixed to a fixation target in a state where the first jig is positioned against the fixation target, the first jig having a guide through-hole extending toward an application portion in a state where the first jig is fixed to the fixation target; an insertion portion inserted into the guide through-hole such that the insertion portion is introduced toward the application portion in a state where an operator grips the insertion portion; and a protruding portion as a protruding portion provided in the insertion portion, the protruding portion inserted into the guide through-hole and cause friction between the protruding portion and the guide through-hole when a predetermined positional relationship is established between a distal end part of the insertion portion and the application portion along with an introduction operation to introduce the insertion portion toward the application portion.

10 Claims, 15 Drawing Sheets

(56) References Cited

U.S. PATENT DOCUMENTS

| | | | |
|---|---|---|---|
| 8,944,718 B2* | 2/2015 | Smith | B23P 11/00 |
| | | | 403/371 |
| 11,333,201 B2* | 5/2022 | Takenaka | F16C 33/6614 |
| 2003/0127298 A1* | 7/2003 | Grillo | F16D 23/12 |
| | | | 192/99 S |
| 2007/0235280 A1* | 10/2007 | Otto | F16D 23/14 |
| | | | 192/113.5 |
| 2011/0303476 A1* | 12/2011 | Jennings | F16D 13/74 |
| | | | 180/312 |
| 2020/0072282 A1* | 3/2020 | Takenaka | F16D 23/14 |
| 2022/0243768 A1* | 8/2022 | Takenaka | F16D 23/14 |
| 2023/0193956 A1* | 6/2023 | Takenaka | F16N 3/10 |
| | | | 184/5.1 |
| 2023/0194048 A1* | 6/2023 | Takenaka | F16N 3/10 |
| | | | 184/28 |
| 2023/0241639 A1* | 8/2023 | Takenaka | B05B 15/62 |
| | | | 118/317 |
| 2023/0243464 A1* | 8/2023 | Takenaka | F16N 3/10 |
| | | | 184/38.1 |
| 2023/0243465 A1* | 8/2023 | Takenaka | F16B 2/005 |
| | | | 184/38.1 |
| 2023/0294137 A1* | 9/2023 | Takenaka | F16C 33/6622 |
| | | | 15/93.1 |

\* cited by examiner

INSERTION AMOUNT GRASPING DEVICE

CROSS-REFERENCE TO RELATED APPLICATION

This application claims priority to Japanese Patent Application No. 2021-204618 filed on Dec. 16, 2021, and Japanese Patent Application No. 2022-184163 filed on Nov. 17, 2022, each incorporated herein by reference in its entirety.

BACKGROUND

1. Technical Field

The present disclosure relates to an insertion amount grasping device.

2. Description of Related Art

The following device has been proposed. That is, the device is configured such that a second jig is inserted into a guide through-hole of a first jig fixed to a clutch housing, and until a predetermined positional relationship is established between a distal end part of a greasing pipe provided in the second jig and an application portion (a part that requires supply of grease from the distal end part of the greasing pipe), the second jig is introduced toward the application portion (for example, see Japanese Unexamined Patent Application Publication No. 2020-37949 (JP 2020-37949 A)).

SUMMARY

However, in JP 2020-37949 A, the application portion (the part that requires supply of grease from the distal end part of the greasing pipe) is placed in an internal space surrounded by a clutch housing (that is, the application portion is covered with the clutch housing). Accordingly, there is such a problem that it is difficult to grasp that the predetermined positional relationship is established between the distal end part of the greasing pipe provided in the second jig and the application portion.

The present disclosure is achieved in order to solve such a problem, and an object of the present disclosure is to provide an insertion amount grasping device that allows an operator to grasp, by hand, that a predetermined positional relationship is established between a distal end part of an insertion portion (e.g., a distal end part of a greasing pipe provided in a second jig) and an application portion (e.g., a part that requires supply of grease from the distal end part of the greasing pipe).

An insertion amount grasping device according to the present disclosure includes a first jig, an insertion portion, and a first protruding portion. The first jig is fixed to a fixation target in a state where the first jig is positioned against the fixation target. The first jig has a guide through-hole extending toward an application portion in a state where the first jig is fixed to the fixation target. The insertion portion is configured to be inserted into the guide through-hole such that the insertion portion is introduced toward the application portion in a state where an operator grips the insertion portion. The first protruding portion is a protruding portion provided in the insertion portion. The first protruding portion is configured to be inserted into the guide through-hole and cause friction between the first protruding portion and the guide through-hole when a predetermined positional relationship is established between a distal end part of the insertion portion and the application portion along with an introduction operation to introduce the insertion portion toward the application portion.

With such a configuration, it is possible to grasp, by hand, that a predetermined positional relationship is established between the distal end part of the insertion portion (e.g., a distal end part of a greasing pipe provided in a second jig) and the application portion (e.g., a part that requires supply of grease from the distal end part of the greasing pipe).

This is because the first protruding portion is provided such that, when the predetermined positional relationship is established between the distal end part of the insertion portion and the application portion along with the introduction operation to introduce the insertion portion toward the application portion, the first protruding portion is inserted into the guide through-hole and causes friction between the first protruding portion and the guide through-hole.

Further, in the insertion amount grasping device, the diameter of the guide through-hole and the thickness of the insertion portion including the first protruding portion may be set to establish a relationship that the diameter of the guide through-hole is smaller than the thickness of the insertion portion including the first protruding portion.

Further, in the insertion amount grasping device, at least one second protruding portion may be provided on an inner wall of the guide through-hole, and along with the introduction operation to introduce the insertion portion toward the application portion, the first protruding portion may cause friction between the first protruding portion and the second protruding portion and pass across the second protruding portion.

With such a configuration, it is possible to grasp, by hand, that a predetermined positional relationship is established between the distal end part of the insertion portion (e.g., the distal end part of the greasing pipe provided in the second jig) and the application portion (e.g., a part that requires supply of grease from the distal end part of the greasing pipe).

This is because the first protruding portion and the second protruding portion are provided such that, when the predetermined positional relationship is established between the distal end part of the insertion portion and the application portion along with the introduction operation to introduce the insertion portion toward the application portion, the first protruding portion and the second protruding portion cause friction (frictional force).

Further, in the insertion amount grasping device, the diameter of the guide through-hole including the second protruding portion and the thickness of the insertion portion including the first protruding portion may be set to establish a relationship that the diameter of the guide through-hole including the second protruding portion is smaller than the thickness of the insertion portion including the first protruding portion.

Further, in the insertion amount grasping device, the fixation target may be a cover member, the application portion may be placed in an internal space surrounded by the cover member, a jig fixation through-hole communicating with the internal space may be formed in the cover member, and the first jig may include an engageable portion configured to engage with a peripheral part of the jig fixation through-hole in the cover member in a state where the first jig is positioned against the cover member. The first jig may be fixed to the cover member such that the engageable portion engages with the peripheral part of the jig fixation through-hole in the cover member.

Further, in the insertion amount grasping device, the insertion portion may be an elongated emission portion having a distal end part from which a hydraulic substance is emitted, or a second jig including the emission portion, and the insertion portion may be inserted into the guide through-hole such that the insertion portion is introduced toward the application portion in a state where the operator grips the insertion portion.

Further, in the insertion amount grasping device, the insertion portion may further include an imaging portion configured to capture an image including the distal end part of the emission portion and the application portion.

Further, in the insertion amount grasping device, the application portion may be a part that requires supply of grease or fluid, and the hydraulic substance may be the grease or the fluid.

Further, in the insertion amount grasping device, the insertion portion may be a second jig including an elongated imaging device having a distal end part in which an imaging portion is provided, the imaging portion being configured to capture an image including the application portion, and the insertion portion may be inserted into the guide through-hole such that the insertion portion is introduced toward the application portion in a state where the operator grips the insertion portion.

Further, in the insertion amount grasping device, the application portion may be a part that requires narrow-space inspection.

With the present disclosure, it is possible to provide an insertion amount grasping device that allows an operator to grasp, by hand, that a predetermined relationship is established between a distal end part of an insertion portion (e.g., a distal end of a greasing pipe provided in a second jig) and an application portion (e.g., a part that requires supply of grease from the distal end part of the greasing pipe).

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

With reference to the drawings, the following more specifically describes a greasing device of a clutch release mechanism as a first embodiment of the present disclosure. Note that the present disclosure is not limited to embodiments to be described below.

First Embodiment

A greasing device according to a first embodiment is used to perform inspection and grease emission maintenance at low cost and in a short time in a case of poor sliding (e.g., poor sliding with an increase in friction, abnormal noise, or the like) caused due to grease outflow from a fork grease lubrication portion inside a MT clutch housing or mixing of foreign matter after a manual transmission vehicle is submerged or crosses over a river.

Figure 1:
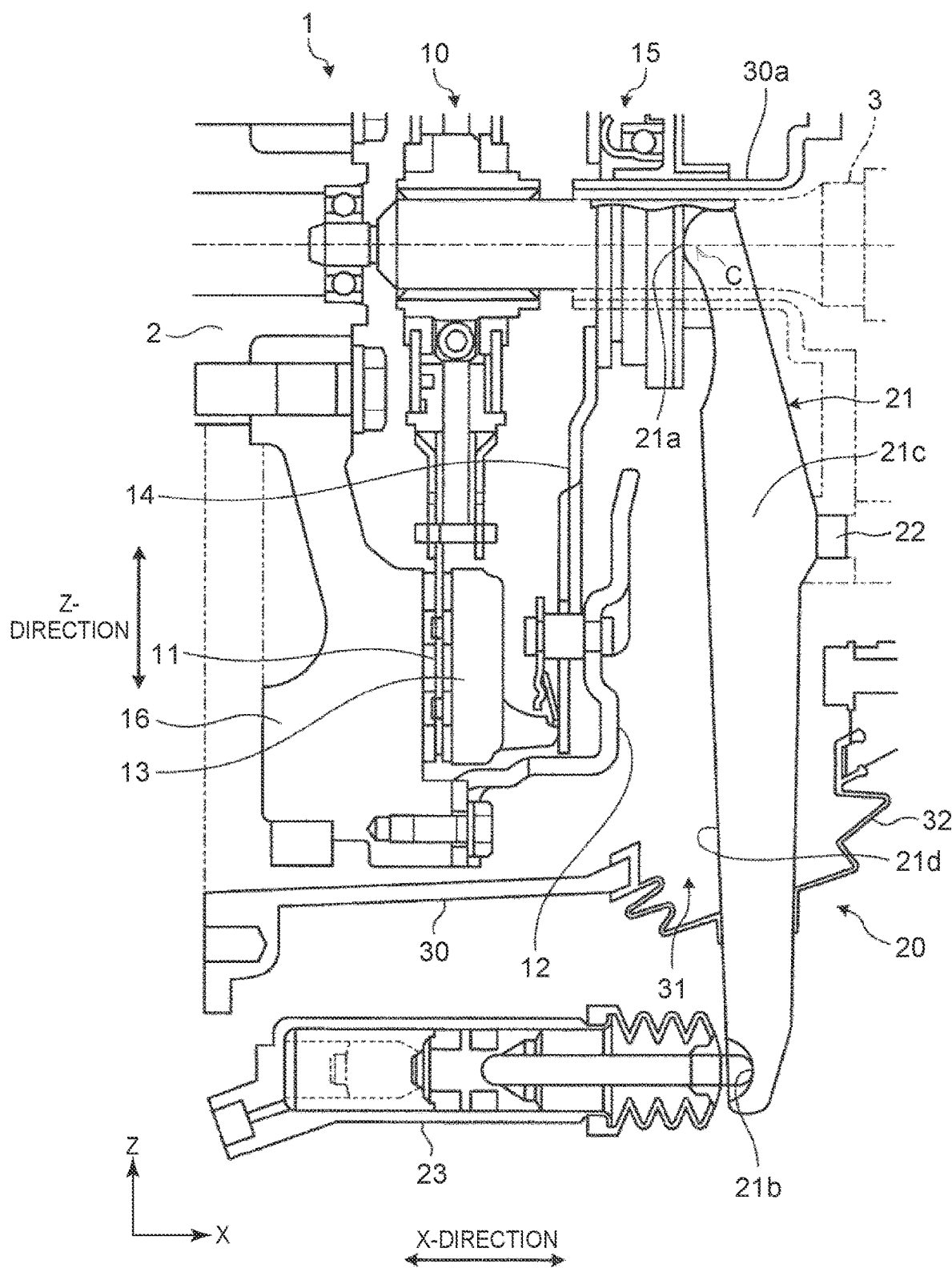
FIG. 1 is a view schematically illustrating a clutch release mechanism of a first embodiment.

FIG. 1 is a view schematically illustrating a clutch release mechanism of the first embodiment. As illustrated in FIG. 1, a clutch device 1 includes a clutch body 10 configured to perform an intermittent operation of power, a clutch release mechanism 20 configured to operate the clutch body 10, and a clutch housing 30 in which the clutch body 10 is accommodated. For example, the clutch device 1 is provided in a manual transmission vehicle and is placed between an engine and a transmission.

Note that an X-direction illustrated in FIG. 1 indicates an axial direction along a central axis, and a Z-direction indicates a direction perpendicular to the central axis (they may be also referred to as a radial direction and a height direction, respectively). In a case where the Z-direction is assumed as the height direction, the upper side may be referred to as a distal end side, and the lower side may be referred to as a base end side. Further, a Y-direction (described below) indicates a direction perpendicular to the X-direction and the Z-direction. The Y-direction may be also referred to as a width direction.

The clutch body 10 includes a clutch disc 11, a clutch cover 12, a pressure plate 13, a diaphragm spring 14, and a release bearing 15.

The clutch disc 11 includes a frictional face (clutch facing) sandwiched between the pressure plate 13 and a flywheel 16 and is splined with an input shaft 3 of the transmission. The rotation of the flywheel 16 is transmitted to the input shaft 3 by frictional force between the frictional face of the clutch disc 11 and the flywheel 16. The flywheel 16 is fastened to a crankshaft 2 of the engine by bolt, so that the flywheel 16 and the crankshaft 2 rotate together in an integrated manner.

The clutch cover 12 is provided to cover the outer peripheral side of the clutch disc 11, so that the pressure plate 13 and the diaphragm spring 14 rotate together in an integrated manner. The pressure plate 13 is provided between the frictional face of the clutch disc 11 and the diaphragm spring 14. The diaphragm spring 14 is a member configured to press the friction face of the clutch disc 11 against the flywheel 16 via the pressure plate 13, and the diaphragm spring 14 is provided on the opposite side of the pressure plate 13 from the frictional face of the clutch disc 11. A peripheral edge part of the diaphragm spring 14 is connected to the pressure plate 13, and a central part of the diaphragm spring 14 is connected to the release bearing 15. Hereby, the diaphragm spring 14 can press the pressure plate 13.

At the time when the clutch body 10 is engaged, the pressure plate 13 presses the friction face of the clutch disc 11 toward the flywheel 16 side by an elastic force of the diaphragm spring 14. Hereby, frictional force is caused between the frictional face of the clutch disc 11 and the flywheel 16, so that a connection state where the rotation of the flywheel 16 is transmitted to the clutch disc 11 is established.

At the time when the clutch body 10 is disengaged, the release bearing 15 presses the central part of the diaphragm spring 14, so that the peripheral edge part of the diaphragm spring 14 is displaced in a direction to be distanced from the flywheel 16. At this time, the pressure plate 13 is drawn to the direction to be distanced from the flywheel 16 together with the diaphragm spring 14. Hereby, the frictional force between the frictional face of the clutch disc 11 and the flywheel 16 is eliminated, so that a disconnection state where the rotation of the flywheel 16 is not transmitted to the clutch disc 11 is established.

The clutch release mechanism 20 includes a clutch release fork 21, a release fork support 22, and a release cylinder 23.

The clutch release fork 21 is a member configured to axially move the release bearing 15 and is configured to be swingable in a state where the clutch release fork 21 is supported by the release fork support 22. The clutch release fork 21 is a metal elongated member and has a structure in which its distal end side is divided into two.

As illustrated in FIG. 1, a first end side of the clutch release fork 21 is constituted by a pressing portion 21a configured to press the release bearing 15 in the axial direction. The pressing portion 21a is configured to have a forked structure in which its distal end side is divided into two to sandwich the input shaft 3 inside the clutch housing 30. A part (an abutment part) of the pressing portion 21a that faces the release bearing 15 in the axial direction makes contact with the release bearing 15. A second end side of the clutch release fork 21 is constituted by a connecting portion 21b projecting outwardly from the clutch housing 30 via a through-hole 31 of the clutch housing 30 such that the connecting portion 21b is connected to the release cylinder 23. Further, the second end side of the clutch release fork 21 is covered with a fork boot 32 at a position where the clutch release fork 21 extends outwardly from the clutch housing 30. The fork boot 32 is attached to the through-hole 31. The fork boot 32 may be provided with a hole (a cooling hole) via which frictional heat caused when the clutch body 10 enters a half-engaged state is released to outside the clutch housing 30.

Further, the clutch release fork 21 includes a supporting point 21c supported by the release fork support 22 between the pressing portion 21a and the connecting portion 21b. The release fork support 22 is constituted by a main body portion fixed to a partition wall of the clutch housing 30, and a pivot portion (not illustrated) having a spherical surface in a distal end side of the main body portion. The partition wall of the clutch housing 30 is constituted by a retainer to which a bearing (not illustrated) for supporting the input shaft 3 is attached. The retainer is a member fixed to the clutch housing 30. A root side of the release fork support 22 is fastened to the retainer by bolt. Further, a boss portion 30a of the retainer extends along the input shaft 3 inside the clutch housing 30. The input shaft 3 is passed through the inside of the boss portion 30a.

The release bearing 15 is configured to be movable axially relative to the boss portion 30a in a state where the release bearing 15 is supported on the outer periphery of the boss portion 30a via a sleeve. The release bearing 15 is placed to make contact with the central part of the diaphragm spring 14. The release bearing 15 includes an outer ring supported by the sleeve on the boss portion 30a and an inner ring making contact with the central part of the diaphragm spring 14. In the release bearing 15, the inner ring making contact with the diaphragm spring 14 rotates, and the outer ring making contact with the clutch release fork 21 does not rotate.

When a driver steps on a clutch pedal (not illustrated), the release cylinder 23 operates. When the connecting portion 21b is operated by the release cylinder 23, the clutch release fork 21 swings around the supporting point 21c as a fulcrum. By this swing, the pressing portion 21a presses the release bearing 15, so that the release bearing 15 axially moves to press the central part of the diaphragm spring 14 toward the flywheel 16 side. Hereby, the clutch body 10 is brought into a disengaged state. When the clutch body 10 is brought into the disengaged state, the flywheel 16 is disconnected from the clutch disc 11 in a power non-transmittable manner. When an operation force from the release cylinder 23 is eliminated, a pressing force to be applied to the release bearing 15 from the pressing portion 21a disappears, so that the clutch body 10 is bought into an engaged state. When the clutch body 10 is brought into the engaged state, the flywheel 16 is connected to the clutch disc 11 in a power transmittable manner. Thus, due to the swinging of the clutch release fork 21, connection and disconnection of the power transmission path between the crankshaft 2 on the engine side and the input shaft 3 on the transmission side are performed.

Next will be described a greasing device 100 according to the first embodiment. The greasing device 100 is a device configured to supply grease to a contact part between the pressing portion 21a of the clutch release fork 21 and the release bearing 15. The greasing device 100 is configured such that a second jig 120 (an insertion portion 121) is inserted into a guide through-hole (a first hole 113, a second hole 114) of a first jig 110 fixed to the clutch housing 30 as will be described later, and until a predetermined positional relationship is established between a distal end part 131 of a greasing pipe 130 provided in the second jig 120 and an application portion C, the second jig 120 (the insertion portion 121) is introduced toward the application portion C.

The application portion C indicates a contact part between the greasing clutch release fork 21 (the pressing portion 21a) and the release bearing 15 as illustrated in FIG. 1, the contact part being a greasing necessary part (a part that requires supply of grease from the distal end part 131 of the greasing pipe 130). As illustrated in FIG. 1, the application portion C is placed in the internal space surrounded by the clutch housing 30 (an example of a cover member in the present disclosure). A jig fixation through-hole (the through-hole 31) communicating with the internal space is formed in the clutch housing 30.

In a case where a vehicle provided with the clutch device 1 is used under the environment where sand, muddy water, or the like is present, foreign matter may enter the clutch housing 30 from a cooling hole of the fork boot 32 or a cooling hole or a water-drain opening (not illustrated) provided in the clutch housing 30. Accordingly, it is desirable to perform maintenance on the clutch release mechanism 20 and to perform greasing maintenance to additionally supply grease to the contact part between the clutch release fork 21 and the release bearing 15. In view of this, the greasing device 100 is configured to perform a greasing maintenance operation without requiring attachment and detachment of the clutch housing 30 (or a manual transmission unit including the clutch housing 30) from the vehicle. The greasing device 100 supplies grease to the contact part between the clutch release fork 21 and the release bearing 15 as a greasing necessary part from outside the clutch housing 30 via the through-hole 31 of the clutch housing 30, by use of the greasing pipe 130 (illustrated in FIG. 2 or the like).

Figure 2:
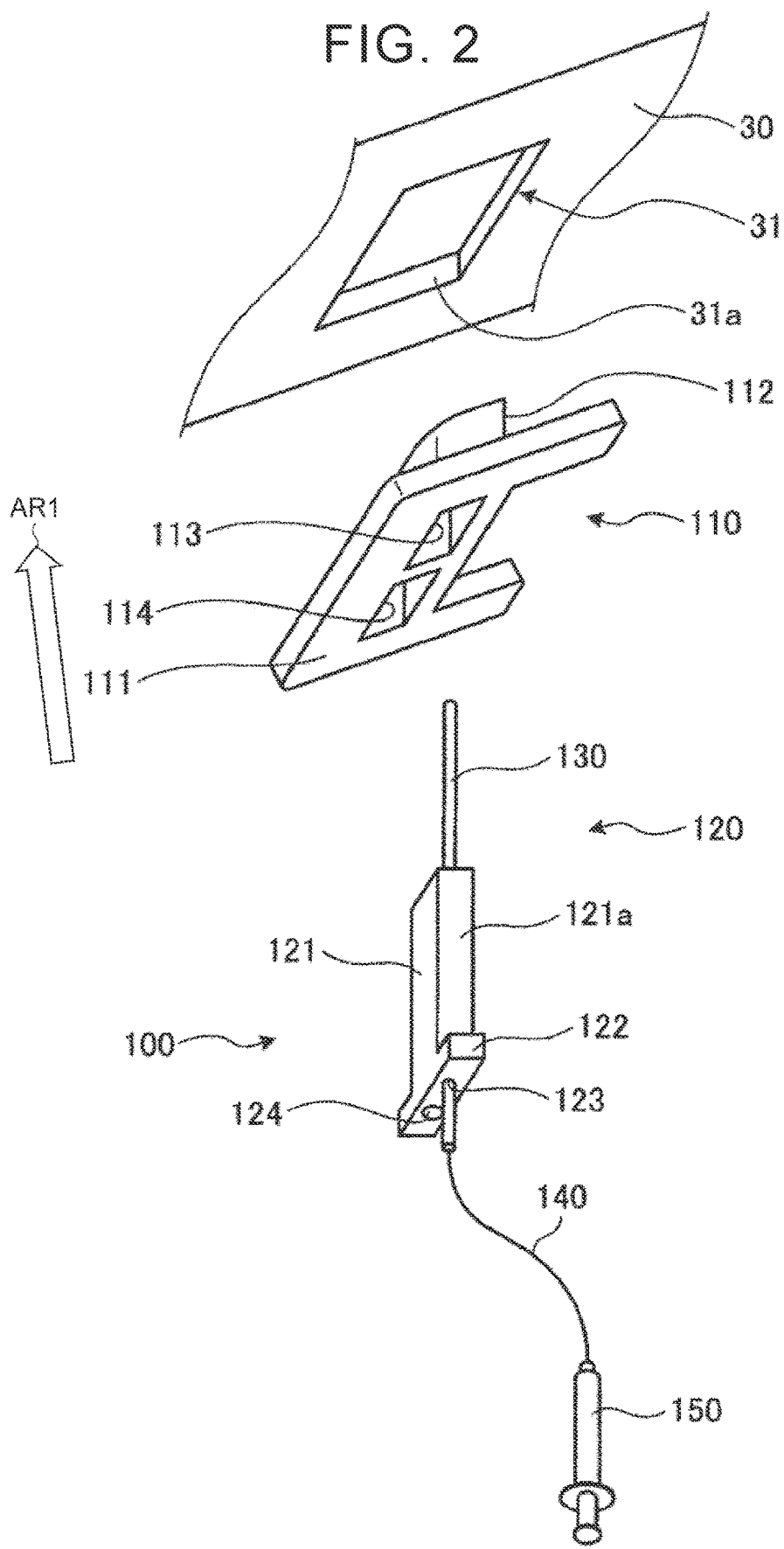
FIG. 2 is a view schematically illustrating a greasing device of the first embodiment.

As illustrated in FIG. 2, the greasing device 100 includes the first jig 110, the second jig 120, the greasing pipe 130, a flexible tube 140, and a greasing tool 150. The first jig 110 and the second jig 120 are members configured to position the greasing pipe 130. The first jig 110 is a member attached to the through-hole 31 of the clutch housing 30. The second jig 120 is a member passed through an insertion hole of the first jig 110.

The first jig 110 is a guide jig configured to restrict a direction (an introduction direction) of the greasing pipe 130 (a grease emission pipe) and includes a base portion 111, a projecting portion 112, the first hole 113, and the second hole 114. The first hole 113 and the second hole 114 are positioning holes. The first jig 110 is a metal molded product. The base portion 111 is formed in a flat-plate shape and has a shape that can partially cover the opening of the through-hole 31. The width (the length in the Y-direction (described later)) of the base portion 111 is larger than the opening width of the through-hole 31. The projecting portion 112 is a part projecting from the base portion 111 and is a part to be inserted into the through-hole 31. The projecting portion 112 abuts with an inner surface 31a of the through-hole 31 and abuts with a plane 21d of the clutch release fork 21, so that the projecting portion 112 functions as a positioning portion that positions the first jig 110.

The first hole 113 and the second hole 114 are insertion holes into which the greasing pipe 130 and the insertion portion 121 of the second jig 120 are inserted and are positioning holes that position the greasing pipe 130. The first hole 113 and the second hole 114 are through-holes formed side by side in the width direction of the first jig 110 and penetrating from the base portion 111 on the base end side toward the projecting portion 112 on the distal end side. Note that, in a case where the first hole 113 and the second hole 114 are not distinguished particularly, they are just referred to as "insertion holes."

The second jig 120 includes an insertion portion 121 having a rectangular column shape and configured to be inserted into the first hole 113 or the second hole 114 of the first jig 110, and a stopper portion 122 configured to abut with a surface 111a of the first jig 110. The second jig 120 is a metal molded product. Further, the greasing pipe 130 is integrated with the second jig 120. The second jig 120 includes two through-holes 123, 124 extending linearly along the insertion portion 121 from the base end side toward the distal end side. The through-hole 123 as a first through-hole is a greasing-pipe hole. The through-hole 124 as a second through-hole is an endoscope hole. The greasing pipe 130 is fixed to the through-hole 123 in a state where the greasing pipe 130 is passed through the through-hole 123. An endoscope 160 is fixed to the through-hole 124 in a state where the endoscope 160 is passed through the through-hole 124 (see FIG. 3). Further, the stopper portion 122 has a stopper surface 122a (illustrated in FIG. 3) configured to abut with the surface 111a of the first jig 110.

The greasing pipe 130 is a pipe configured to supply grease to the contact part between the pressing portion 21a of the clutch release fork 21 and the release bearing 15 inside the clutch housing 30. The greasing pipe 130 is an elongated emission portion including the distal end part 131 from which grease (an example of a hydraulic substance in the present disclosure) is emitted. The greasing pipe 130 is made of metal. The distal end part 131 of the greasing pipe 130 is provided with an opening 131a from which grease is emitted. The flexible tube 140 is connected to the base end side of the greasing pipe 130. The greasing pipe 130 is connected to the greasing tool 150 via the flexible tube 140.

Figure 3:
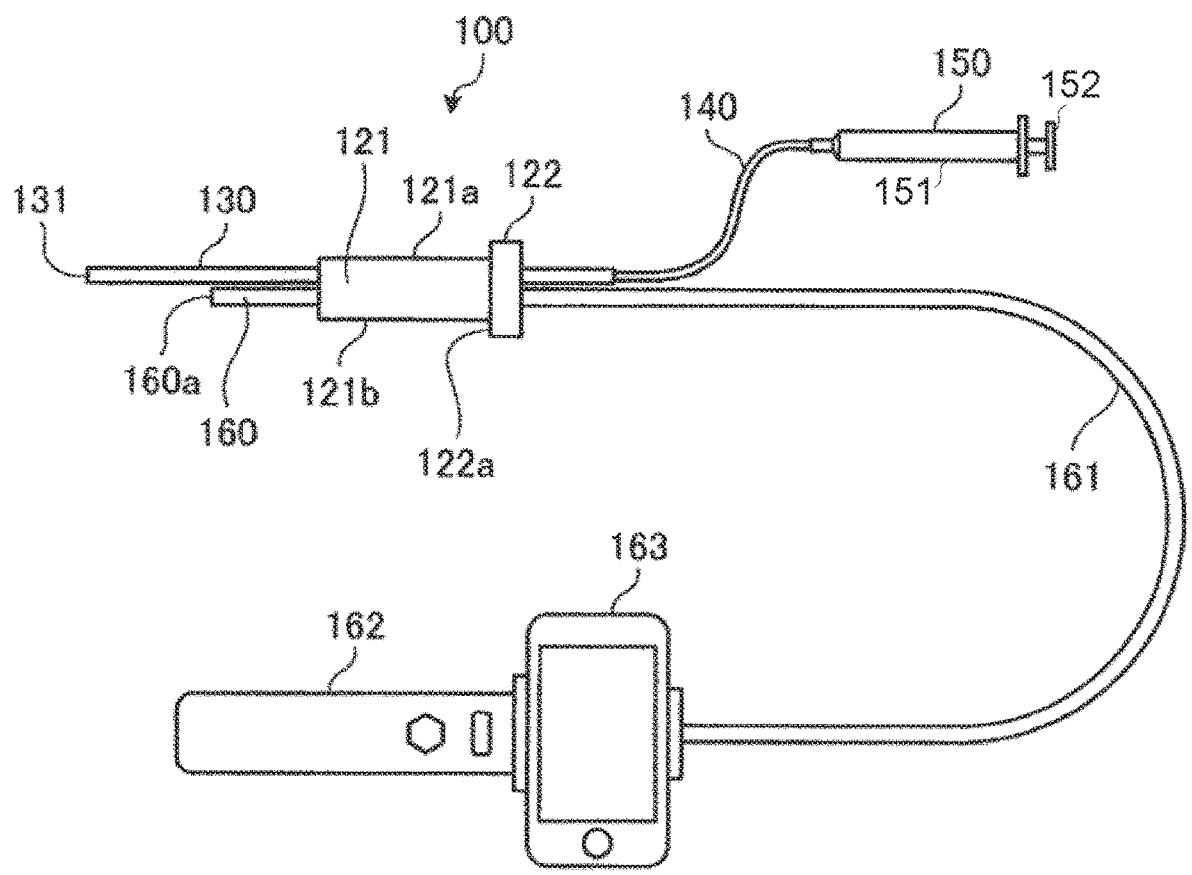
FIG. 3 is a schematic view to describe the greasing device.

As illustrated in FIG. 3, the greasing device 100 includes the endoscope 160 as imaging means. The endoscope 160 is an elongated imaging device configured such that an imaging portion configured to capture an image including the distal end part of the greasing pipe 130 and its surrounding structural object (e.g., the application portion C) is provided in a distal end part 160a of the endoscope 160. The endoscope 160 is an example of an imaging device of the present disclosure. The endoscope 160 is integrated with the second jig 120 and projects from the distal end side of the insertion portion 121. The distal end side of the endoscope 160 is a part to be inserted into the clutch housing 30, and the distal end part 160a of the endoscope 160 is provided with a lens. The base end side of the endoscope 160 is connected to an operating portion 162 via a cable 161. By operating the operating portion 162, an image of an internal structure of the clutch housing 30 can be captured by the endoscope 160. The image captured by the endoscope 160 (an image including the distal end part of the greasing pipe 130 and the surrounding structural object (e.g., the application portion C)) can be displayed on a display portion 163 attached to the operating portion 162.

The greasing tool 150 is constituted by a cylinder 151 and a pushing rod 152 (a piston) (see FIG. 3). The flexible tube 140 is connected to the cylinder 151 of the greasing tool 150. By pressing the pushing rod 152 in a state where grease is filled in the cylinder 151, the grease can be supplied to the greasing pipe 130 from the greasing tool 150. For example, it is also possible to smoothly perform greasing by operating the greasing tool 150 such that the greasing pipe 130 is inserted into the clutch housing 30 from the through-hole 31 in a state where grease is filled in the greasing pipe 130 and the flexible tube 140 in advance.

Figure 4A:
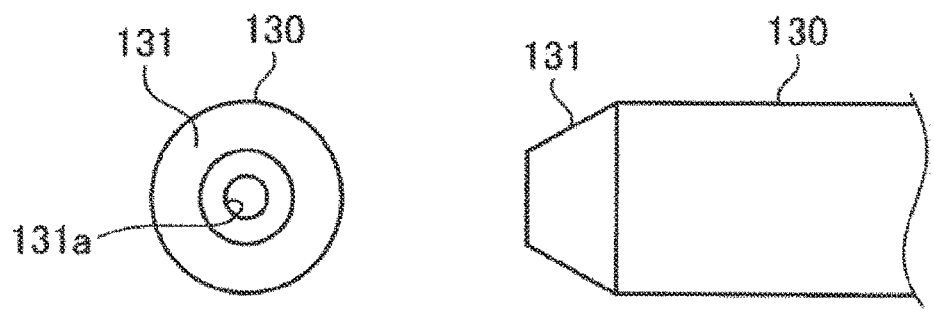
FIG. 4A is a view illustrating one example of an opening of a greasing pipe.
Figure 4B:
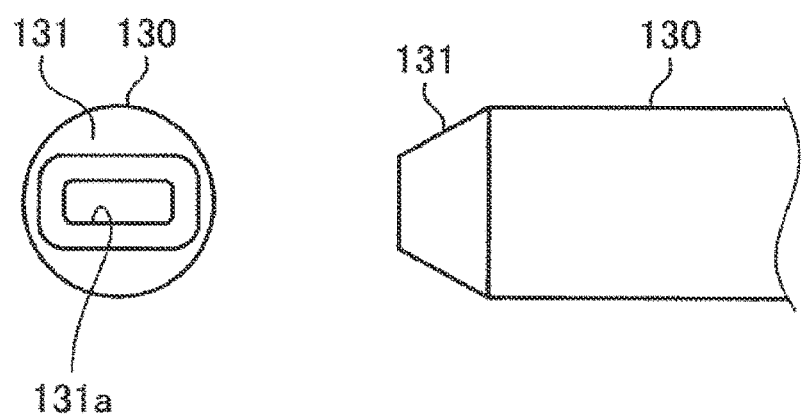
FIG. 4B is a view illustrating another example of the opening of the greasing pipe.

The distal end part 131 of the greasing pipe 130 includes the opening 131a from which grease is emitted, the opening 131a having a shape reduced in diameter. For example, the opening 131a of the greasing pipe 130 may be the opening 131a having a round shape as illustrated in FIG. 4A. Alternatively, the opening 131a may be the flat opening 131a as illustrated in FIG. 4B. When the distal end part 131 of the greasing pipe 130 has a shape reduced in diameter, greasing to a greasing necessary part is performable through a narrow-width space in the clutch housing 30.

Figure 5:
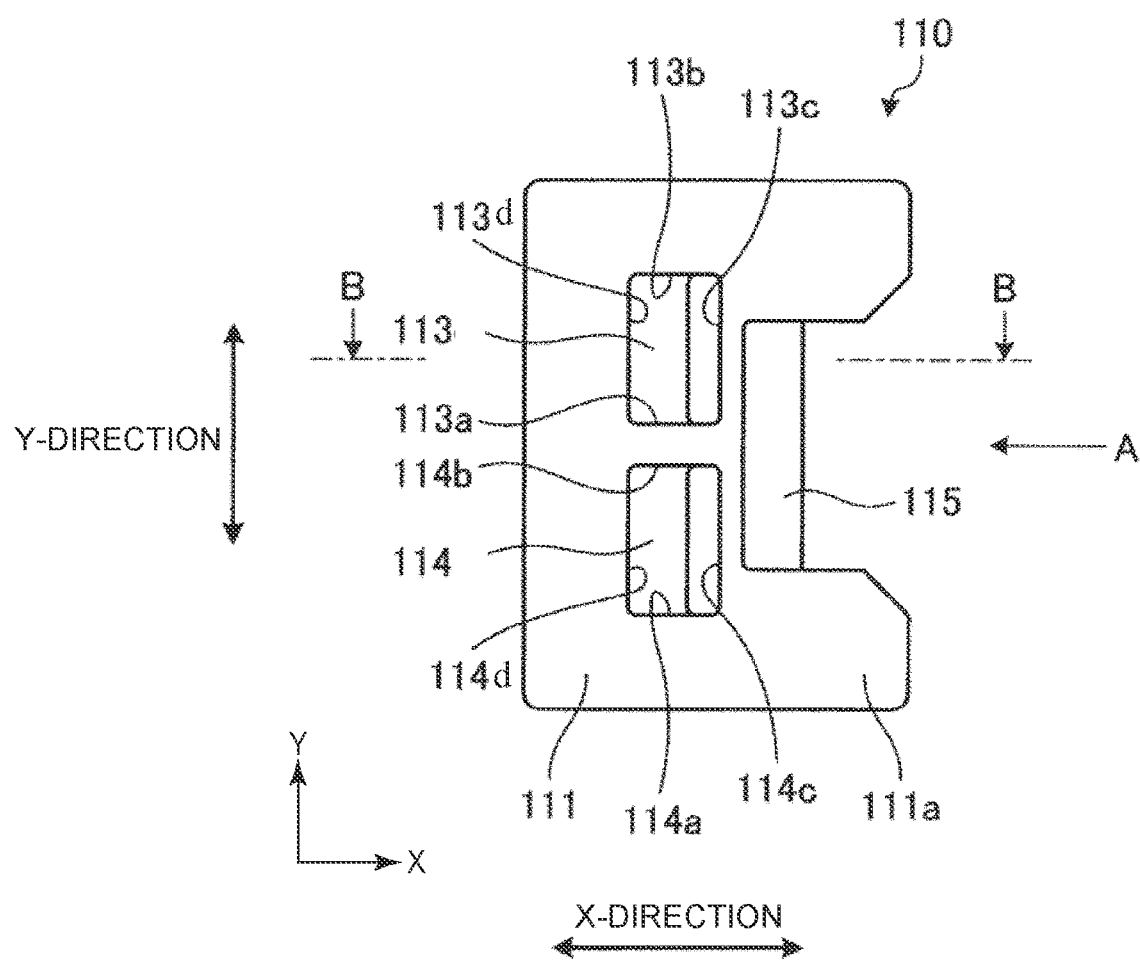
FIG. 5 is a plan view of a base end side of a first jig.
Figure 6A:
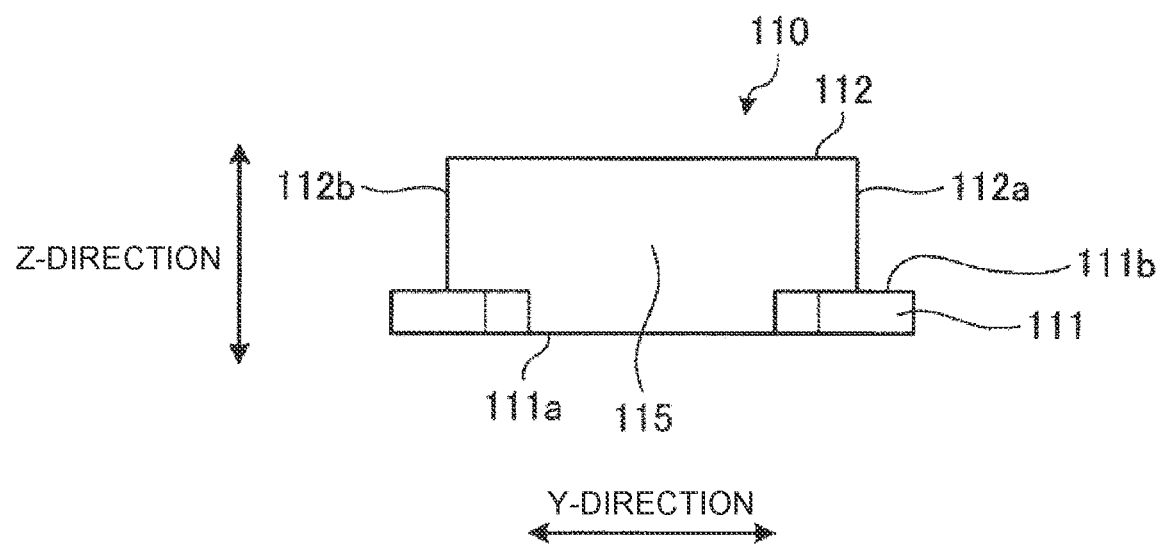
FIG. 6A is a view illustrating a view taken along an arrow A in FIG. 5.
Figure 6B:
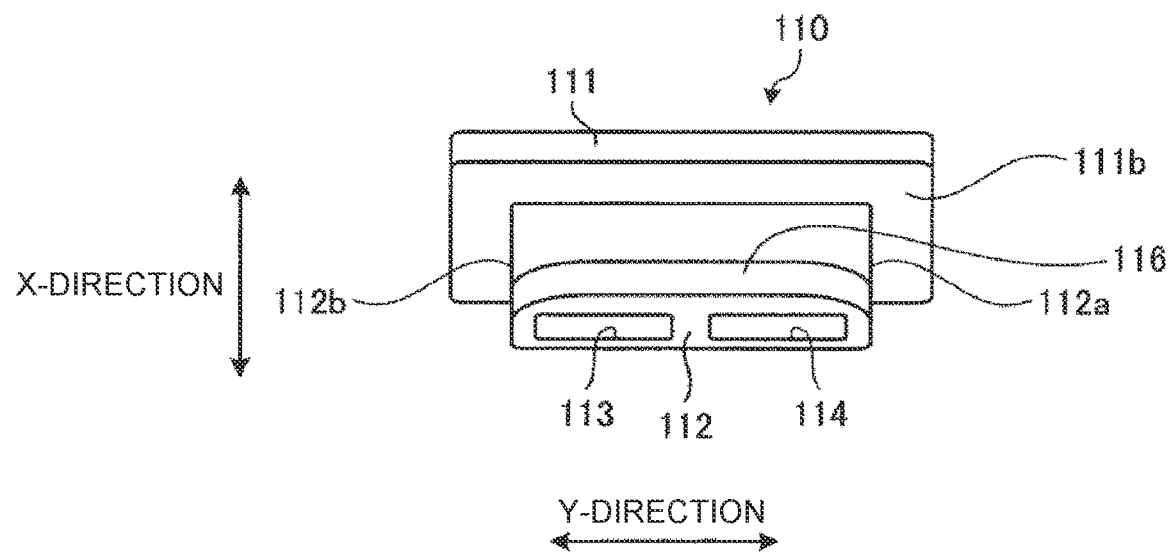
FIG. 6B is a perspective view of the first jig viewed from its back surface side.
Figure 6C:
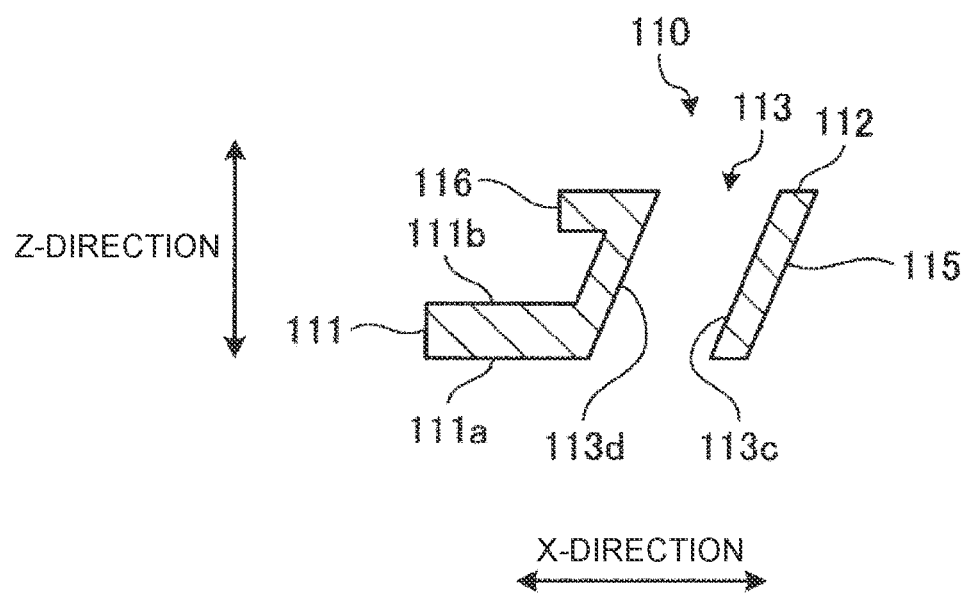
FIG. 6C is a view illustrating a section taken along a line B-B in FIG. 5.

Here, with reference to FIGS. 5 and 6A to 6C, the first jig 110 will be described in detail. FIG. 5 is a plan view of the base end side of the first jig 110. FIG. 6A is a view illustrating a view taken along an arrow A in FIG. 5. FIG. 6B is a perspective view of the first jig 110 viewed from its back surface side. FIG. 6C is a view illustrating a section taken along a line B-B in FIG. 5.

As illustrated in FIG. 5, the first jig 110 has rectangular openings as the first hole 113 and the second hole 114 on the surface 111a side of the base portion 111. The inner surface of the first hole 113 is a surface functioning as a guide surface with which the insertion portion 121 abuts such that the greasing pipe 130 is positioned. The inner surface of the first hole 113 has a first surface 113a, a second surface 113b, a third surface 113c, and a fourth surface 113d. The first surface 113a and the second surface 113b are surfaces facing the Y-direction and correspond to short-side parts of the rectangular shape. The third surface 113c and the fourth surface 113d are surfaces facing the X-direction and correspond to long-side parts of the rectangular shape. The inner surface of the second hole 114 is a surface functioning as a guide surface for positioning the greasing pipe 130. The inner surface of the second hole 114 has a first surface 114a, a second surface 114b, a third surface 114c, and a fourth surface 114d. The first surface 114a and the second surface 114b are surfaces facing the Y-direction and correspond to short-side parts of the rectangular shape. The third surface 114c and the fourth surface 114d are surfaces facing the X-direction and correspond to long-side parts of the rectangular shape.

Further, the first jig 110 has an abutting surface 115 configured to abut with the plane 21d of the clutch release fork 21. The abutting surface 115 is a positioning surface, and by abutting with the plane 21d of the clutch release fork 21, the abutting surface 115 can determine the position of the first jig 110 in the X-direction. As illustrated in FIG. 6A, the abutting surface 115 has a predetermined width in the width direction (the Y-direction) of the base portion 111 and extends along the height direction (the Z-direction) of the projecting portion 112.

As illustrated in FIG. 6B, a key portion 116 is provided on a back surface 111b side of the first jig 110. The key portion 116 is a part caught on the clutch housing 30 when the projecting portion 112 is inserted into the through-hole 31. The key portion 116 functions as a part that holds the first jig 110 in the through-hole 31. Further, the openings of the first hole 113 and the second hole 114 that are opened in the projecting portion 112 also have a rectangular shape similarly to the base end side. As illustrated in FIG. 6C, the first hole 113 linearly extends inside the projecting portion 112.

Figure 7:
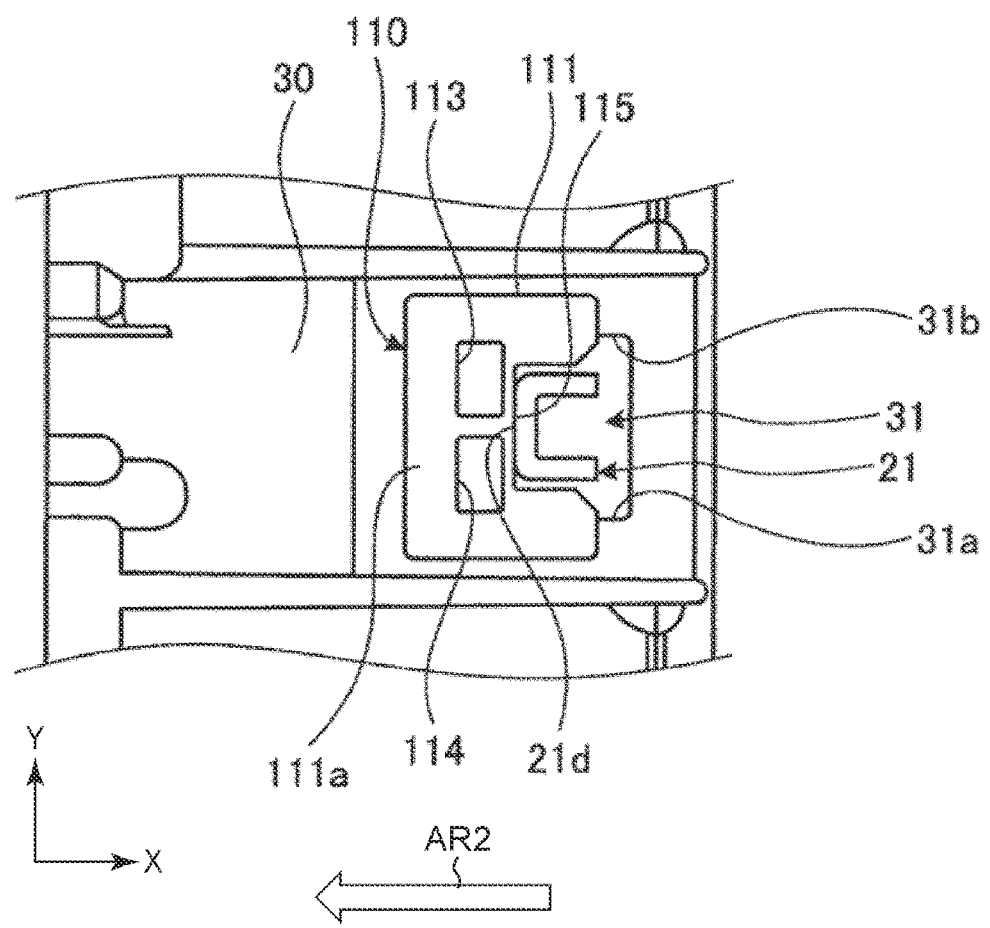
FIG. 7 is a view illustrating a state where the first jig is attached to a through-hole of a clutch housing.
Figure 8:
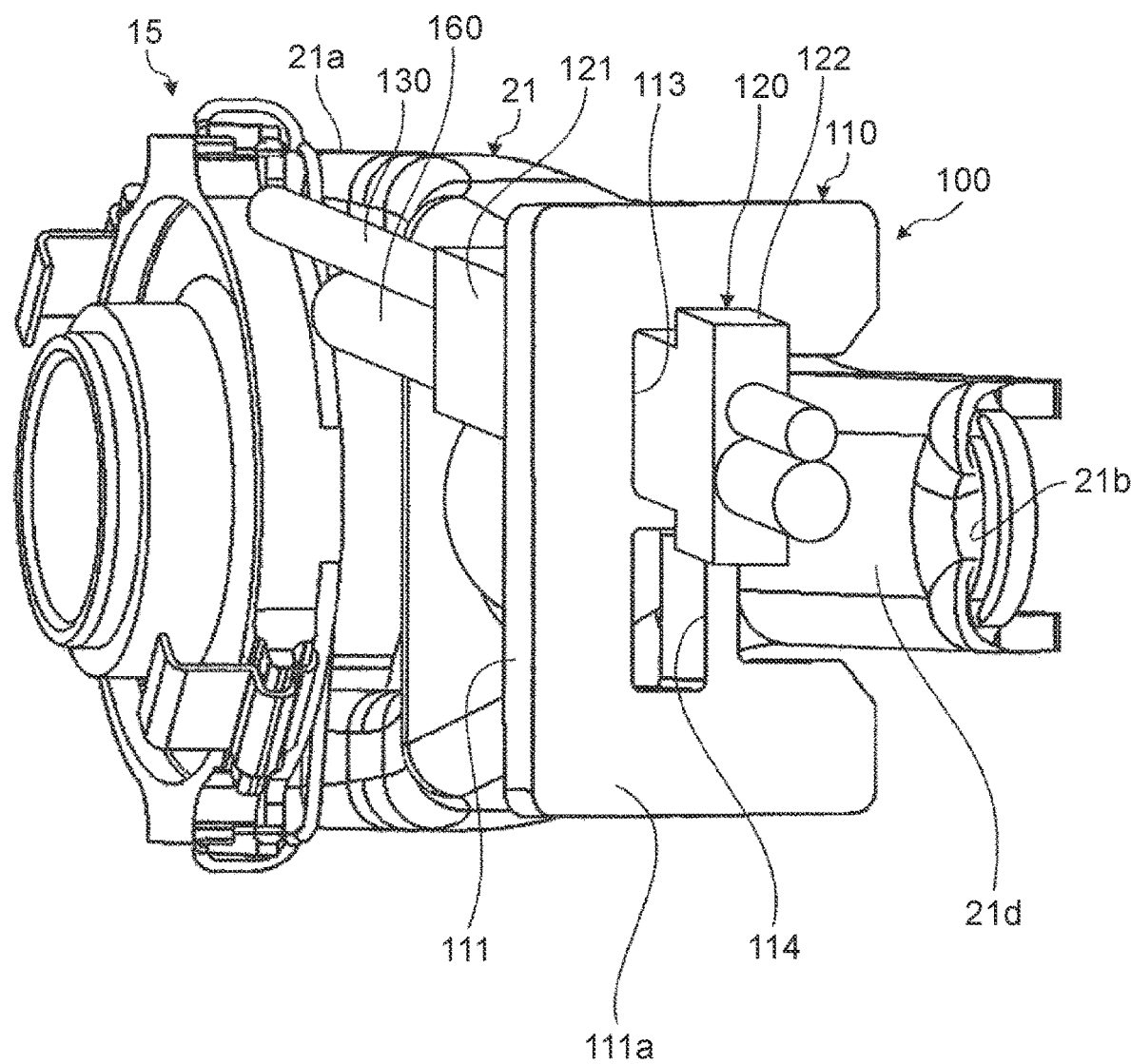
FIG. 8 is a view illustrating a state where the greasing pipe extends toward a pressing portion of a clutch release fork in a state where a second jig is inserted into an insertion hole of the first jig.
Figure 9:
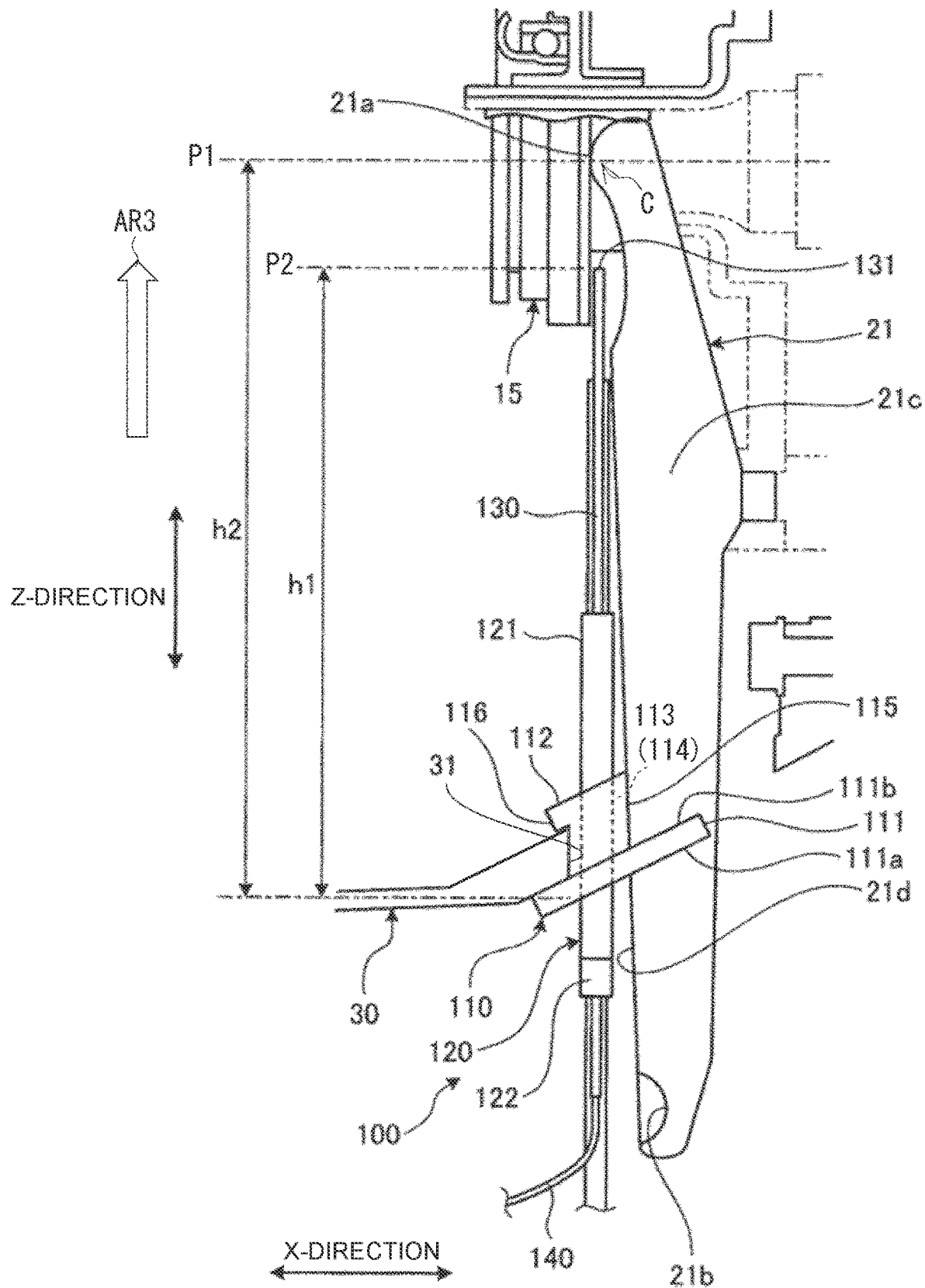
FIG. 9 is a view to describe the height position of a distal end part of the greasing pipe.

With reference to FIGS. 7 to 9, the following describes a greasing method by use of the greasing device 100. FIG. 7 is a view illustrating a state where the first jig 110 is attached to the through-hole 31 of the clutch housing 30. FIG. 8 is a view illustrating a state where the greasing pipe 130 extends toward the pressing portion 21a of the clutch release fork 21 in a state where the second jig 120 is inserted into the insertion hole of the first jig 110. FIG. 9 is a view to describe the height position of the distal end part 131 of the greasing pipe 130. Note that the Z-direction illustrated in FIG. 9 indicates the height direction. Before the following steps are performed, the fork boot 32 is removed. Hereby, the through-hole 31 (see FIGS. 2, 9, and so on) of the clutch housing 30 into which the greasing pipe 130 is to be inserted is exposed.

As a first step, the first jig 110 is fixed to the through-hole 31 of the clutch housing 30 (an example of a fixation target in the present disclosure).

Figure 11:
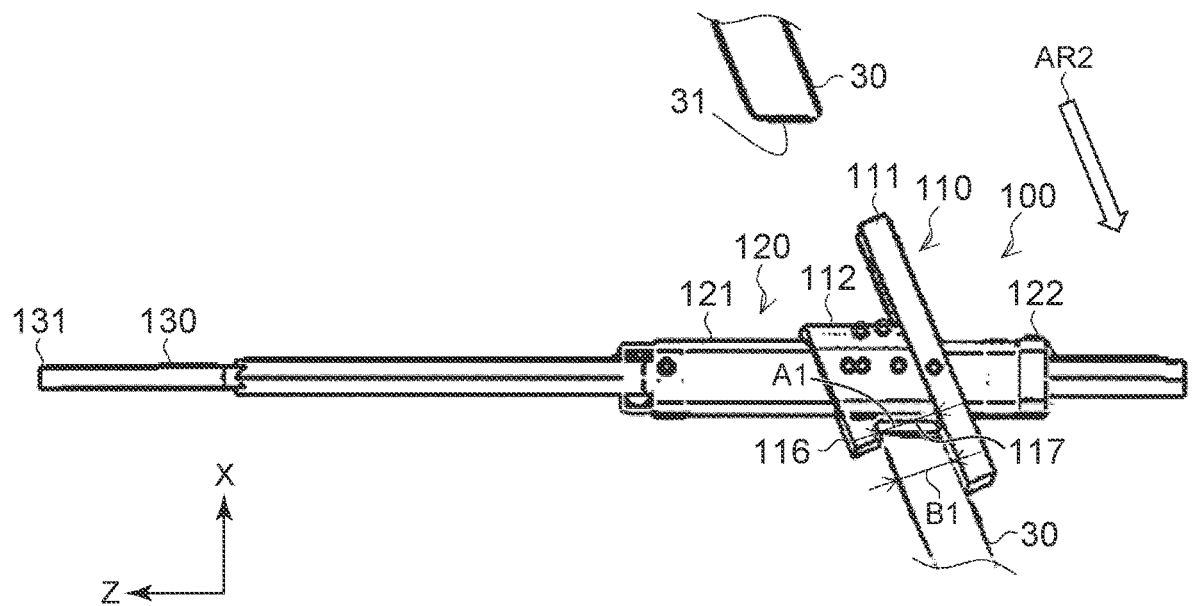
FIG. 11 is a view illustrating a first jig 110 and a second jig 120 extracted from FIG. 9.

FIG. 11 is a view illustrating the first jig 110 and the second jig 120 extracted from FIG. 9.

As illustrated in FIG. 11, the first jig 110 is fixed to the clutch housing 30 (a peripheral part of the through-hole 31) in a state where the first jig 110 is positioned against the clutch housing 30 in terms of the X-direction, the Y-direction, and the Z-direction.

More specifically, first, the projecting portion 112 of the first jig 110 is placed to face the through-hole 31 of the clutch housing 30 (see FIG. 2), and the abutting surface 115 of the first jig 110 is placed to face (make contact with) the clutch release fork 21 (the plane 21d) (see FIG. 7).

Subsequently, the first jig 110 is slid along the clutch release fork 21 (the plane 21d) in a direction to approach the through-hole 31 (see an arrow AR1 in FIG. 2) until the projecting portion 112 of the first jig 110 is inserted into the through-hole 31 and the base portion 111 of the first jig 110 abuts with the peripheral part of the through-hole 31 in the clutch housing 30.

Hereby, the projecting portion 112 of the first jig 110 is inserted into the through-hole 31, and the side faces 112a, 112b of the projecting portion 112 face (abut with) the inner surfaces 31a, 31b of the through-hole 31, so that the first jig 110 is positioned against the clutch housing 30 in terms of the Y-direction.

Further, the base portion 111 of the first jig 110 abuts with the peripheral part of the through-hole 31 in the clutch housing 30, so that the first jig 110 is positioned against the clutch housing 30 in terms of the Z-direction.

Then, the first jig 110 is pushed in a direction of an arrow AR2 (see FIGS. 7, 11) in a state where the first jig 110 is positioned against the clutch housing 30 in terms of the Y-direction and the Z-direction as described above.

More specifically, the first jig 110 is pushed in the direction of the arrow AR2 (see FIGS. 7, 11) in a state where the first jig 110 is positioned against the clutch housing 30 in terms of the Y-direction and the Z-direction as described above, until the peripheral part of the through-hole 31 in the clutch housing 30 is inserted (fitted by pressing) into a space between the base portion 111 and the key portion 116 in the first jig 110 (see FIG. 11), and the peripheral part of the through-hole 31 abuts with a bottom portion 117 between the base portion 111 and the key portion 116 in the first jig 110.

A distance A1 (see FIG. 11) between the base portion 111 and the key portion 116 in the first jig 110 and a thickness B1 (see FIG. 11) of the peripheral part of the through-hole 31 in the clutch housing 30 are set to satisfy a relationship of A1<B1. Accordingly, when the first jig 110 is pushed in the direction of the arrow AR2 (see FIGS. 7, 11) in a state where the first jig 110 is positioned against the clutch housing 30 in terms of the Y-direction and the Z-direction as described above, the peripheral part of the through-hole 31 in the clutch housing 30 is inserted (fitted by pressing) into the space between the base portion 111 and the key portion 116 in the first jig 110. Hereby, the first jig 110 is fixed to the clutch housing 30.

Further, when the peripheral part of the through-hole 31 in the clutch housing 30 abuts with the bottom portion 117 between the base portion 111 and the key portion 116 in the first jig 110, the first jig 110 is positioned against the clutch housing 30 in terms of the X-direction.

As described above, the first jig 110 is fixed to the clutch housing 30 (the peripheral part of the through-hole 31) in a state where the first jig 110 is positioned against the clutch housing 30 (an example of a fixation target in the present disclosure) in terms of the X-direction, the Y-direction, and the Z-direction. Stated differently, the first jig 110 engages with the peripheral part of the through-hole 31 in the clutch housing 30 in a state where the first jig 110 is positioned against the clutch housing 30 in terms of the X-direction, the Y-direction, and the Z-direction. The base portion 111 and the key portion 116 of the first jig 110 correspond to an example of an engageable portion in the present disclosure.

In a state where the first jig 110 is fixed to the clutch housing 30 (the peripheral part of the through-hole 31) as such, the first hole 113 of the first jig 110 extends toward the application portion C (a first pressing portion 21a) (see FIG. 9). Similarly, the second hole 114 of the first jig 110 extends toward the application portion C (a second pressing portion 21a). Note that the first jig 110 can be removed from the clutch housing 30 by performing the steps in a reverse manner to the above.

As a step subsequent to the first step, a step (insertion step) of inserting the greasing pipe 130 and the second jig 120 into the insertion hole (the first hole 113, the second hole 114) of the first jig 110 fixed to the clutch housing 30 as described above is performed. In the insertion step, at the time when the second jig 120 is inserted into the insertion hole (the first hole 113, the second hole 114) of the first jig 110, the insertion step is performed in a two-stage manner. On side faces 121a, 121b of the insertion portion 121 of the second jig 120, marking lines (described later in the second embodiment) are provided at positions distanced from the distal end side by a predetermined distance. The outer peripheral shape of the insertion portion 121 is formed in a rectangular shape. The side faces 121a, 121b correspond to short-side parts of the rectangular shape. Further, the side face 121a is a first surface in the Y-direction, and the side face 121b is a second surface in the Y-direction. Further, the rectangular shape of the insertion portion 121 is smaller than the rectangular shape of the opening of the first hole 113 and the rectangular shape of the opening of the second hole 114.

As illustrated in FIG. 8, when the insertion portion 121 of the second jig 120 is inserted into the first hole 113 of the first jig 110, the greasing pipe 130 extends toward the pressing portion 21a of the clutch release fork 21 that is a greasing necessary part. Since the pressing portion 21a has a forked structure, the greasing pipe 130 inserted into the first hole 113 extends toward the first pressing portion 21a. Before the greasing pipe 130 reaches the vicinity of the pressing portion 21a of the clutch release fork 21, it may be necessary to avoid an obstacle inside the clutch housing 30. For example, the obstacle may be a clip as a component part of the release bearing 15. Since the clip is provided near the forked structure of the clutch release fork 21, it is desirable to prevent the greasing pipe 130 from hitting the clip before the greasing pipe 130 reaches the pressing portion 21a.

In view of this, as a second step (a first half step in the insertion step), the insertion portion 121 of the second jig 120 is inserted into the insertion hole of the first jig 110 up to the position of the marking line. In the insertion state in the second step, the second jig 120 can be operated such that the position of the second jig 120 relative to the first jig 110 is displace inside the insertion hole so that the greasing pipe 130 and the endoscope 160 can avoid the obstacle inside the clutch housing 30. That is, as a third step, a step (an avoiding operation step) of operating the second jig 120 to avoid the internal structure in the clutch housing 30 is performed. In the following steps, while an operator watches a screen (e.g., an image including the distal end part of the greasing pipe 130 and its surrounding structural object (e.g., the application portion C)) displayed on the display portion 163 attached to the operating portion 162 gripped by a first hand (for example, the right hand), the operator performs an introduction operation to introduce the second jig 120 (the insertion portion 121) gripped by a second hand (e.g., the left hand) toward the application portion C in a direction of an arrow AR3 (see FIGS. 9, 11) so that the distal end part 131 of the greasing pipe 130 reaches the application portion C (see FIG. 9).

In the third step, in a state where the insertion portion 121 is inserted into the first hole 113, a clearance (around 0.5 mm) is provided between each of the side faces 121a, 121b of the insertion portion 121 and the inner surface (the inner wall) of the first hole 113. Similarly, in a state where the insertion portion 121 is inserted into the second hole 114, a clearance (around 0.5 mm) is provided between each of the side faces 121a, 121b of the insertion portion 121 and the inner surface (the inner wall) of the second hole 114. Accordingly, in a state where the second jig 120 is inserted into the insertion hole up to the position of the marking line, the greasing pipe 130 can be positioned at a position where the greasing pipe 130 avoids the internal structure such as a clip at a height position where the greasing pipe 130 does not make contact with the clip of the release bearing 15. In this case, the operator can hold the stopper portion 122 side by hand and operate the second jig 120 to swing the distal end side of the insertion portion 121 in the Y-direction.

As illustrated in FIG. 9, when the height position of the distal end part 131 of the greasing pipe 130 is a height h1, the distal end part 131 can avoid the clip of the release bearing 15. In this case, the insertion of the greasing pipe 130 is stopped, and the position of the distal end part 131 is controlled such that the distal end part 131 avoids the clip of the release bearing 15. The height h1 also indicates an insertion amount (a stroke amount).

For example, in the third step, as the operation for the greasing pipe 130 to avoid the obstacle inside the clutch housing 30 in a state where the side face 121b of the insertion portion 121 abuts with the first surface 113a of the first hole 113, the side face 121a of the insertion portion 121 is brought into contact with the second surface 113b of the first hole 113 that is in a noncontact state. At this time, the second jig 120 is moved until the insertion portion 121 slides on the third surface 113c of the first hole 113 and the side face 112a makes contact with the second surface 113b. This sliding includes an operation of moving parallel in the Y-direction and an operation of swinging the distal end part 131 side in the right-left direction. Hereby, the greasing pipe 130 is placed at a position where the greasing pipe 130 does not make contact with the clip.

Thus, after the position of the greasing pipe 130 is fixed at the position where the greasing pipe 130 avoids the obstacle inside the clutch housing 30, the distal end part 131 of the greasing pipe 130 is moved again to approach the greasing necessary part. That is, the insertion step of inserting the second jig 120 is restarted, so that the insertion portion 121 is inserted into the through-hole 31 to a position where the stopper portion 122 of the second jig 120 abuts with the base portion 111 of the first jig 110. In a state where the stopper portion 122 of the second jig 120 makes contact with the first jig 110, the distal end part 131 of the greasing pipe 130 is inserted to a predetermined target position inside the clutch housing 30. That is, as a fourth step (a second half step in the insertion step), the insertion portion 121 is inserted deeper than the position of the marking line, such that the distal end part 131 of the greasing pipe 130 is inserted to the greasing necessary part.

As illustrated in FIG. 9, in the fourth step, the distal end part 131 of the greasing pipe 130 reaches a height h2 at which the first pressing portion 21a of the forked structure is placed. Thus, the distal end part 131 of the greasing pipe 130 can be fixed at a position in the vicinity of the pressing portion 21a of the clutch release fork 21. The height h2 has an insertion amount larger than the height h1.

Then, as a fifth step, a step of supplying grease from the opening 131a of the greasing pipe 130 is performed. In the fifth step, while the operator watches the screen (e.g., the image including the distal end part of the greasing pipe 130 and its surrounding structural object (e.g., the application portion C)) displayed on the display portion 163 attached to the operating portion 162 gripped by the first hand (for example, the right hand), the operator grips and operates the greasing tool 150 (e.g., the operator pushes the pushing rod 152 illustrated in FIG. 3 in its axial direction) by the second hand (e.g., the left hand) to supply the grease to the application portion C (see FIG. 9) from the opening 131a of the greasing pipe 130. In the fifth step, when only an appropriate amount of the grease is supplied from the greasing tool 150 connected to the greasing pipe 130, the appropriate amount of the grease is emitted from the distal end part 131 of the greasing pipe 130, so that the grease is applied to the pressing portion 21a. In this case, the grease from the greasing tool 150 is filled into the greasing pipe 130 in advance. Accordingly, when the distal end part 131 of the greasing pipe 130 is fixed at a desired position, greasing is smoothly performed by operating the greasing tool 150.

When the greasing in the fifth step is completed, a pulling step of pulling out the greasing pipe 130 is performed as a sixth step. In the sixth step, in a state where the first jig 110 is attached to the through-hole 31, the grease is drained off from the distal end part 131 of the greasing pipe 130. After that, the second jig 120 is pulled out from the through-hole 31, and the distal end part 131 of the greasing pipe 130 is also pulled out from the through-hole 31 to outside the clutch housing 30.

For example, the second jig 120 is pulled out from the insertion hole of the first jig 110. When the second jig 120 is pulled out from the insertion hole of the first jig 110, the second jig 120 can be swung in the right-left direction due to the clearance provided between the insertion hole and the insertion portion 121. This can avoid the grease from being attached to a part other than the greasing necessary part or a component.

In a case where the steps from the first step to the fifth step are steps for the first hole 113, the steps from the second step to the fifth step for the second hole 114 are performed while the state where the first jig 110 is attached is maintained. Hereby, it is possible to perform greasing on both of the pressing portions 21a of the forked structure.

Note that, in a case where there is no obstacle in an area up to the greasing necessary part inside the clutch housing 30, the second step and the third step may be omitted. In this case, the marking lines in the second jig 120 are unnecessary, and the fourth step may be performed subsequently to the first step such that the insertion portion 121 of the second jig 120 is inserted into the insertion hole of the first jig 110 and is continuously inserted until the stopper portion 122 abuts with the first jig 110.

Figure 10A:
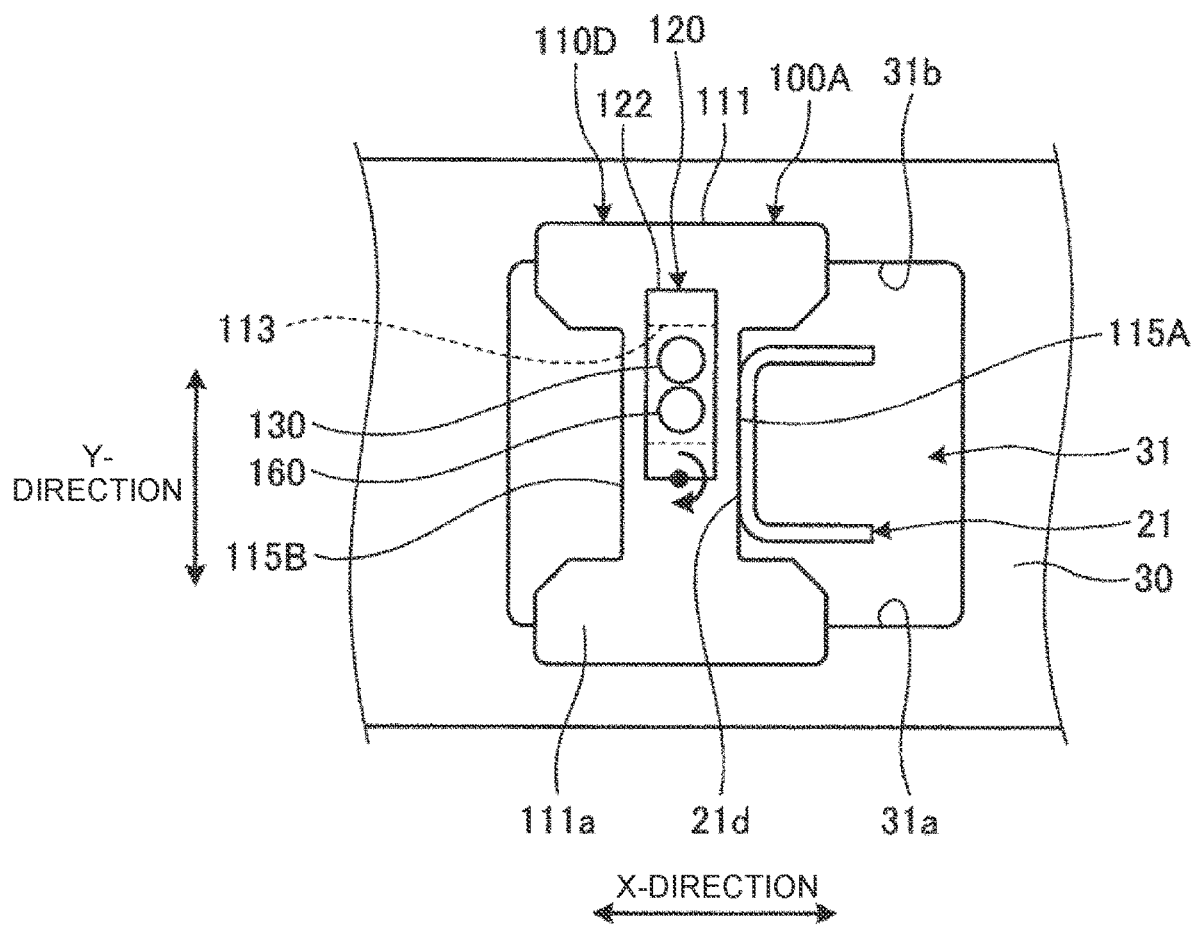
FIG. 10A is a view schematically illustrating a first modification of the first jig.
Figure 10B:
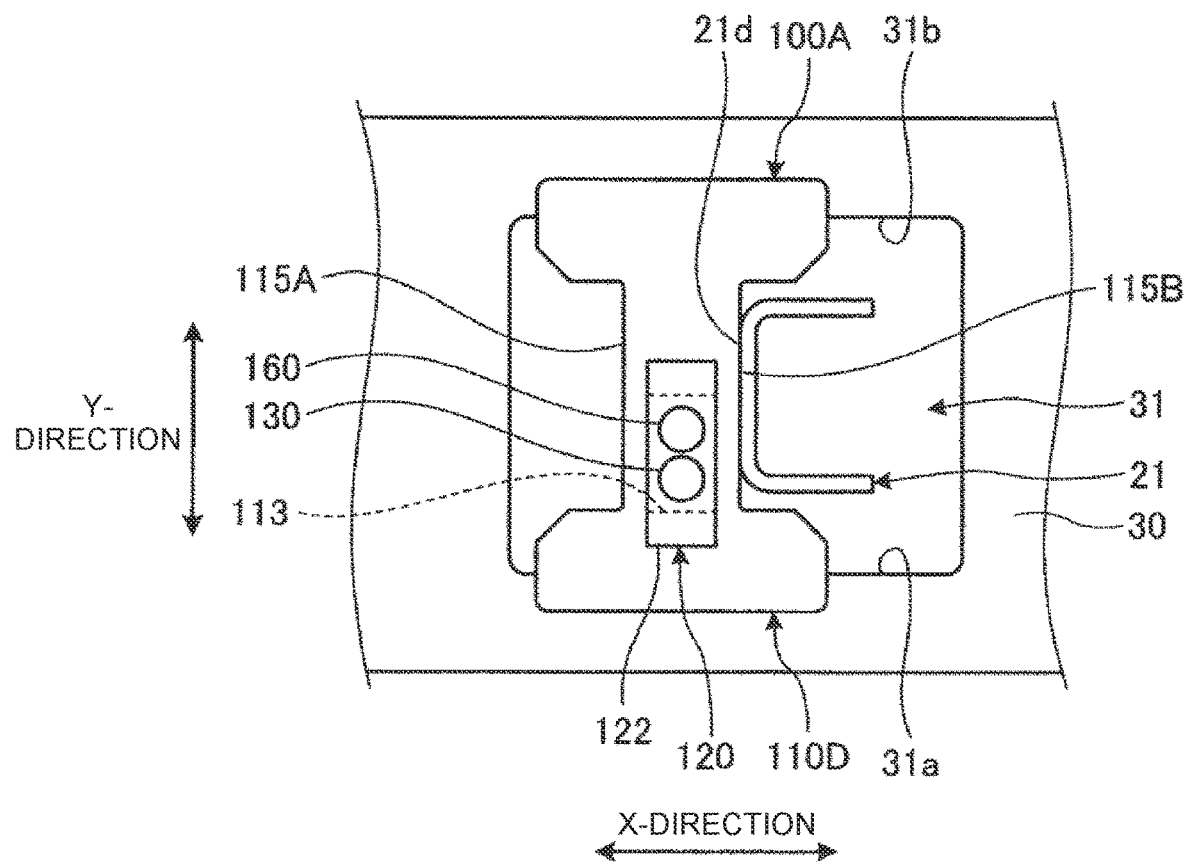
FIG. 10B is a view schematically illustrating the first modification of the first jig.

As described above, with the greasing device 100 according to the first embodiment, it is possible to perform greasing on the pressing portion 21a of the clutch release fork 21 even without removing the clutch housing 30 (or a manual transmission unit including this) from the vehicle. Hereby, the greasing maintenance operation can be easily performed, thereby improving operation efficiency. FIGS. 10A and 10B schematically show a modification of the first jig 110. A first jig 110D includes the base portion 111, the projecting portion 112, and the first hole 113 for positioning. The first hole 113 is an insertion hole into which the greasing pipe 130, the endoscope 160, and the second jig 120 are inserted. Here, the first hole 113 is disposed at a position displaced from the center of the first jig 110D in the Y direction. As a result, in the greasing device 100A, grease can be applied to a different position by rotating the first jig 110D by 180 degrees and inserting the first jig 110D after the first jig 110D is inserted. FIG. 10A is a schematic diagram when the first jig 110D is inserted. FIG. 10B is a schematic diagram when the first jig 110D in FIG. 10A is rotated by 180 degrees and inserted. In FIG. 10A, a first side surface 115A of the first jig 110D serves as an abutting surface that abuts on the clutch release fork 21. In FIG. 10B, a second side surface 115B of the first jig 110D serves as an abutting surface that abuts on the clutch release fork 21. The greasing pipe 130 is located outside the endoscope 160 with respect to the center in the Y direction. Note that, the endoscope 160 may be located outside the greasing pipe 130 with respect to the center in the Y direction.

Second Embodiment

Next will be described an insertion amount grasping device 100A according to a second embodiment.

Figure 12A:
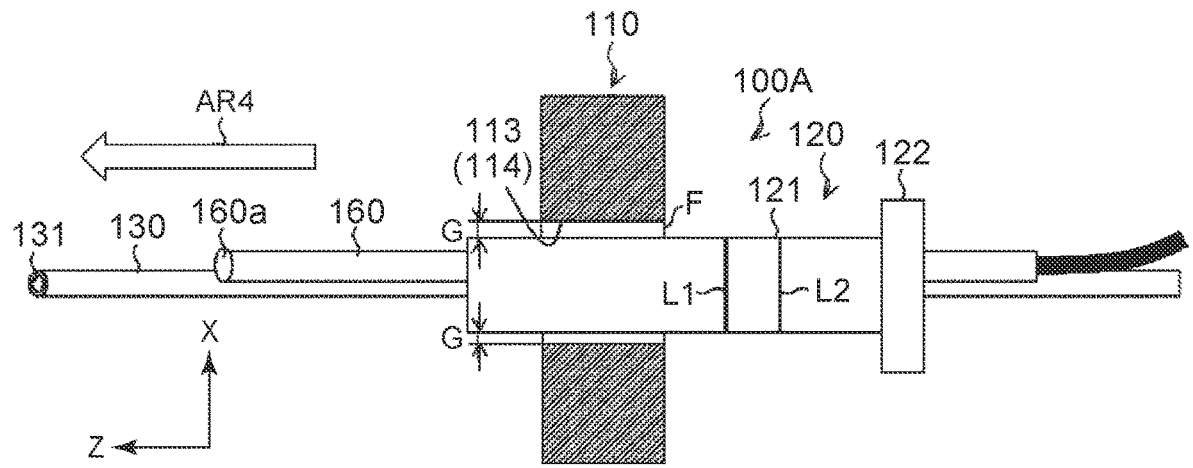
FIG. 12A is a schematic view of an insertion amount grasping device of a second embodiment.
Figure 12B:
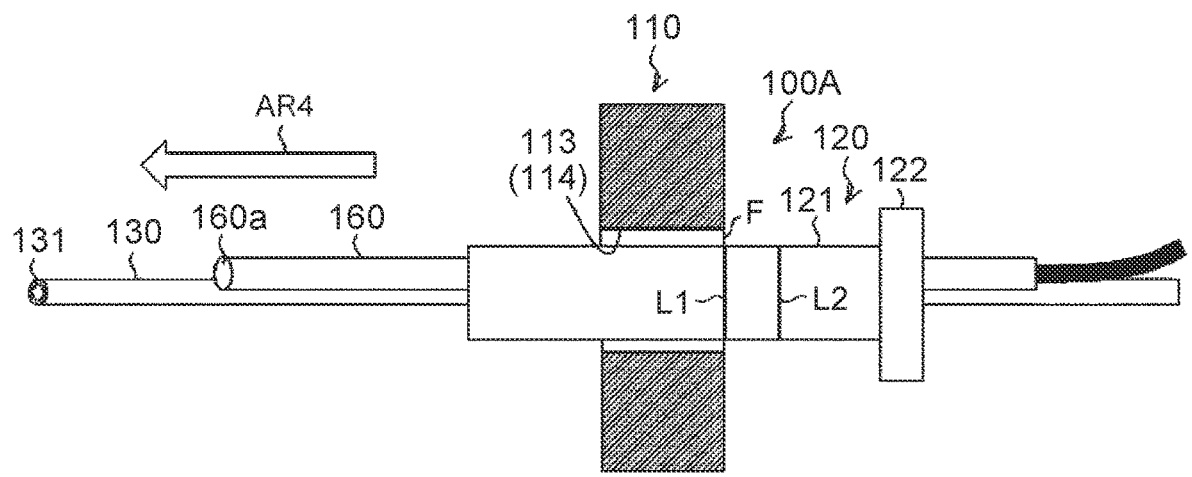
FIG. 12B is a schematic view of the insertion amount grasping device of the second embodiment.
Figure 12C:
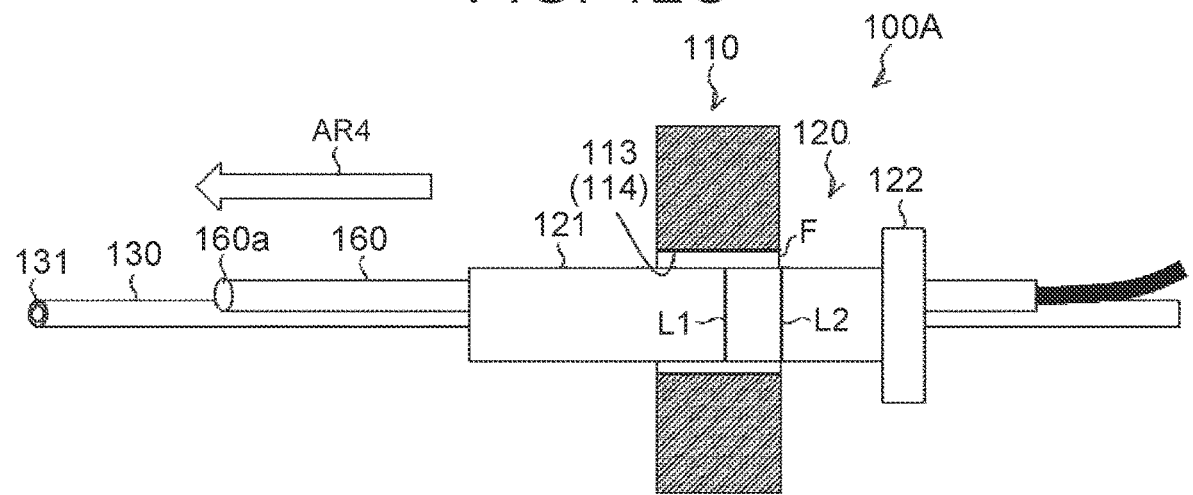
FIG. 12C is a schematic view of the insertion amount grasping device of the second embodiment.

FIGS. 12A to 12C are schematic views of the insertion amount grasping device of the second embodiment. FIGS. 12A to 12C sequentially illustrate a state where the second jig 120 is inserted into the first jig 110.

The insertion amount grasping device 100A is a device for an operator to grasp, by visual inspection from outside the clutch housing 30, a necessary amount of insertion of the second jig 120 into the first jig 110 (hereinafter also referred to as the necessary insertion amount) until the distal end part 131 of the greasing pipe 130 reaches a position P1 in the vicinity of the application portion C (see FIG. 9) or a position P2 before the application portion C by a predetermined distance (see FIG. 9).

The insertion amount grasping device 100A has a configuration similar to that of the greasing device 100 in the first embodiment but is different from the greasing device 100 in the first embodiment in that a first marking line L1 and a second marking line L2 are provided in the insertion portion 121 of the second jig 120.

The following description describes mainly points different from the first embodiment. A constituent identical with a constituent described in the first embodiment has the same reference sign as the constituent described in the first embodiment, and a description thereof is omitted appropriately. In the following description, as described in the first embodiment, the first jig 110 is fixed to the clutch housing 30 (the peripheral part of the through-hole 31) in a state where the first jig 110 is positioned against the clutch housing 30 in terms of the X-direction, the Y-direction, and the Z-direction.

The first jig 110 and the second jig 120 may be made of resin or may be made of metal.

As illustrated in FIG. 12A, the insertion portion 121 of the second jig 120 is inserted into the first hole 113 (or the second hole 114) formed in the first jig 110 and is introduced toward the application portion C (see FIG. 9) in a direction of an arrow AR4 in a state where the operator grips the second jig 120. Along with the introduction operation to introduce the second jig 120 toward the application portion C, the distal end part 131 of the greasing pipe 130 eventually reaches the position P2 (see FIG. 9) before the application portion C by the predetermined distance or the distal end part 131 of the greasing pipe 130 reaches the position P1 (see FIG. 9) in the vicinity of the application portion C.

In order to grasp, by visual inspection, the necessary insertion amount of the second jig 120 into the first jig 110 until the distal end part 131 of the greasing pipe 130 reaches the position P2 (see FIG. 9) before the application portion C by the predetermined distance or the position P1 (see FIG. 9) in the vicinity of the application portion C, the first marking line L1 and the second marking line L2 are provided in the insertion portion 121 of the second jig 120 as illustrated in FIG. 12A. Note that, instead of the marking lines L1, L2, a mark such as a line drawn by a felt pen or a sticker may be provided in the insertion portion 121 of the second jig 120.

The first marking line L1 is provided at a position (see FIG. 12B) where the first marking line L1 reaches the first jig 110 (e.g., a guide flange F provided in the first jig 110) (e.g., a position where the first marking line L1 and the guide flange F overlap each other) when the distal end part 131 of the greasing pipe 130 reaches the position P2 (see FIG. 9) before the application portion C by the predetermined distance (when a predetermined positional relationship is established between the distal end part 131 of the greasing pipe 130 and the application portion C).

Accordingly, by checking the positional relationship between the first marking line L1 and the first jig 110 (e.g., the guide flange F provided in the first jig 110) by visual inspection from outside the clutch housing 30, the operator can grasp a necessary insertion amount of the second jig 120 into the first jig 110 until the distal end part 131 of the greasing pipe 130 reaches the position P2 (see FIG. 9) before the application portion C by the predetermined distance.

The second marking line L2 is provided at a position (see FIG. 12C) where the second marking line L2 reaches the first jig 110 (e.g., the guide flange F provided in the first jig 110) (e.g., a position where the second marking line L2 and the guide flange F overlap each other) when the distal end part 131 of the greasing pipe 130 reaches the position P1 (see FIG. 9) in the vicinity of the application portion C (when a predetermined positional relationship is established between the distal end part 131 of the greasing pipe 130 and the application portion C).

Accordingly, by checking the positional relationship between the second marking line L2 and the first jig 110 (e.g., the guide flange F provided in the first jig 110) by visual inspection from outside the clutch housing 30, the operator can grasp a necessary insertion amount of the second jig 120 into the first jig 110 until the distal end part 131 of the greasing pipe 130 reaches the position P1 (see FIG. 9) in the vicinity of the application portion C.

Note that the marking line L1 may be omitted.

As described above, with the second embodiment, it is possible to grasp, by visual inspection from outside the clutch housing 30, the necessary insertion amount of the second jig 120 into the first jig 110 until the distal end part 131 of the greasing pipe 130 reaches the position P1 (see FIG. 9) in the vicinity of the application portion C or the position P2 (see FIG. 9) before the application portion C by the predetermined distance.

Further, the second embodiment yields the following advantage. That is, different vehicle types (different manual transmission units) may require different necessary insertion amounts (strokes) until the distal end part 131 of the greasing pipe 130 reaches the vicinity of the application portion C. In this case, for each of the vehicle types (manual transmission units) that require different necessary insertion amounts, a corresponding mark (e.g., a marking line, a line drawn by a felt pen or a sticker) is provided in the insertion portion 121 of the second jig 120 such that the corresponding mark reaches the first jig 110 (e.g., the guide flange F provided in the first jig 110) when the distal end part 131 of the greasing pipe 130 reaches the vicinity of the application portion C. Hereby, it is possible to perform greasing by use of a single first jig 110 on the different vehicle types (the different manual transmission units) that requires different necessary insertion amounts. That is, it is not necessary to prepare different first jigs 110 for respective vehicle types (respective manual transmission units), thereby making it possible to restrain an increase in the number of types of the first jig 110 and an increase in investment (cost) along with that.

Third Embodiment

Next will be described an insertion amount grasping device 100B according to a third embodiment.

Figure 13A:
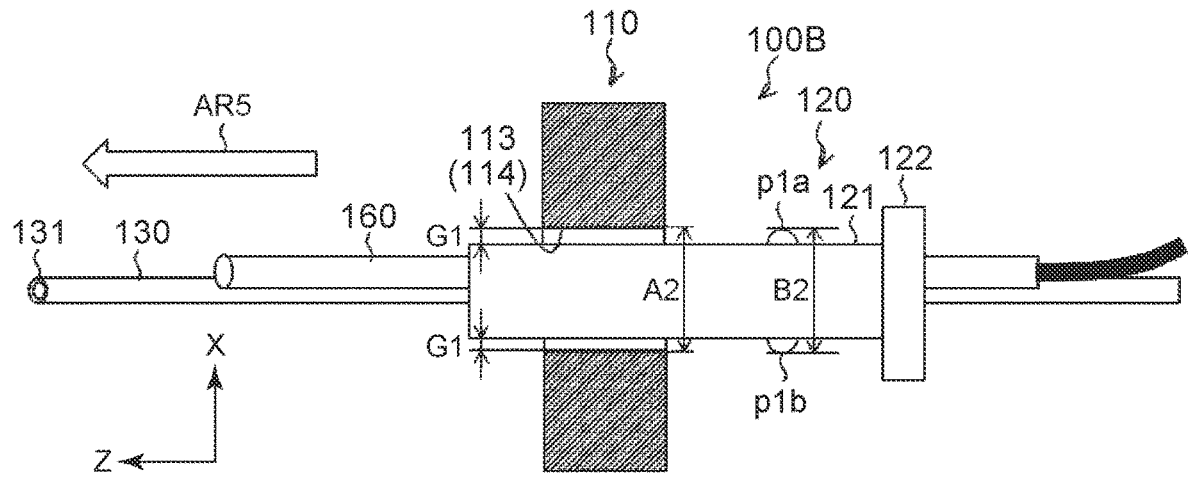
FIG. 13A is a schematic view of an insertion amount grasping device of a third embodiment.
Figure 13B:
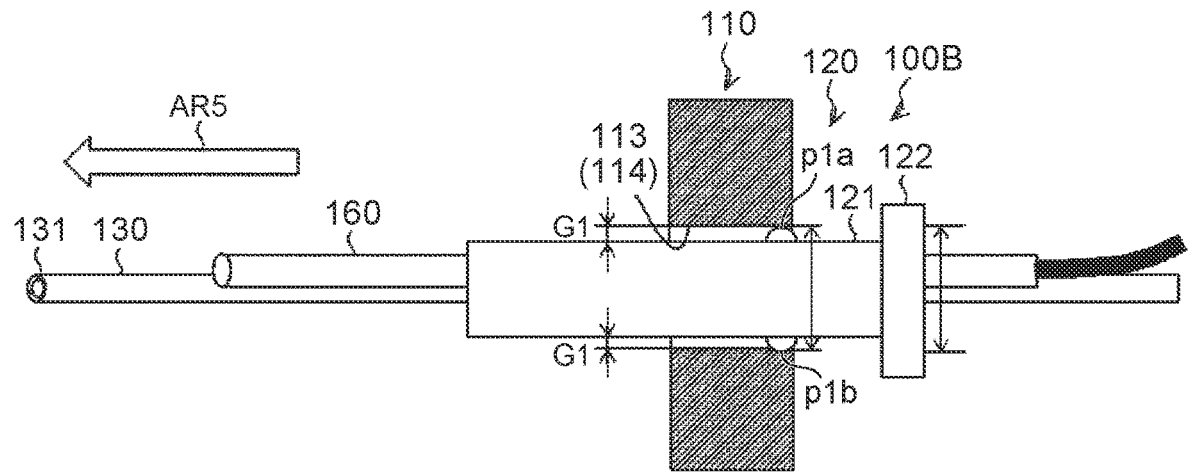
FIG. 13B is a schematic view of the insertion amount grasping device of the third embodiment.

FIGS. 13A, 13B are schematic views of the insertion amount grasping device of the third embodiment. FIGS. 13A, 13B sequentially illustrate a state where the second jig 120 is inserted into the first jig 110.

The insertion amount grasping device 100B is a device for the operator to grasp, by hand (the sensation in the hand gripping the second jig 120) without visual inspection, that the distal end part 131 of the greasing pipe 130 reaches the position P1 (see FIG. 9) in the vicinity of the application portion C (a predetermined positional relationship is established between the distal end part 131 of the greasing pipe 130 and the application portion C).

The insertion amount grasping device 100B has a configuration similar to that of the greasing device 100 in the first embodiment but is different from the greasing device 100 in the first embodiment in that first protruding portions P1a, p1b are provided in the insertion portion 121 of the second jig 120.

The following description describes mainly points different from the first embodiment. A constituent identical with a constituent described in the first embodiment has the same reference sign as the constituent described in the first embodiment, and a description thereof is omitted appropriately. In the following description, as described in the first embodiment, the first jig 110 is fixed to the clutch housing 30 (the peripheral part of the through-hole 31) in a state where the first jig 110 is positioned against the clutch housing 30 in terms of the X-direction, the Y-direction, and the Z-direction.

At least one of the first jig 110 and the second jig 120 is made of resin. In a case where either one of the first jig 110 and the second jig 120 is made of resin, the other of them may be made of resin or may be made of metal.

As illustrated in FIG. 13A, the insertion portion 121 of the second jig 120 is inserted into the first hole 113 (or the second hole 114) formed in the first jig 110 and is introduced toward the application portion C (see FIG. 9) in a direction of an arrow AR5 in a state where the operator grips the second jig 120. Along with the introduction operation to introduce the second jig 120 toward the application portion C, the distal end part 131 of the greasing pipe 130 eventually reaches the position P1 (see FIG. 9) in the vicinity of the application portion C.

In order to grasp, by hand (the sensation in the hand gripping the second jig 120) without visual inspection, that the distal end part 131 of the greasing pipe 130 reaches the position P1 (see FIG. 9) in the vicinity of the application portion C (a predetermined positional relationship is established between the distal end part 131 of the greasing pipe 130 and the application portion C), the first protruding portions p1a, p1b are provided in the insertion portion 121 of the second jig 120.

The first protruding portions p1a, p1b are semi-spherical protruding portions, for example. Note that the first protruding portions p1a, p1b are not limited to the semi-spherical protruding portions and may be protruding portions having other shapes.

The first protruding portions p1a, p1b are provided at a position where, when the distal end part 131 of the greasing pipe 130 reaches the position P1 (see FIG. 9) in the vicinity of the application portion C along with the introduction operation to introduce the second jig 120 toward the application portion C, the first protruding portions p1a, p1b are inserted into the first hole 113 (or the second hole 114) (see FIG. 13B) and cause friction (frictional force) between the first hole 113 (or the second hole 114) and the first protruding portions p1a, p1b.

In order to cause this friction, as illustrated in FIG. 13A, a diameter A2 (a design dimension) of the first hole 113 (and the second hole 114) and a thickness B2 (a design dimension) of the insertion portion 121 of the second jig 120 including the first protruding portions p1a, p1b are set to establish a relationship of A2<B2.

Accordingly, the operator can grasp that the distal end part 131 of the greasing pipe 130 reaches the position P1 (see FIG. 9) in the vicinity of the application portion C along with the introduction operation to introduce the second jig 120 toward the application portion C (the operator can grasp the friction), by hand (the sensation in the hand gripping the second jig 120) without visual inspection.

As described above, with the third embodiment, it is possible to grasp, by hand (the sensation in the hand gripping the second jig 120) without visual inspection, that the distal end part 131 of the greasing pipe 130 reaches the position P1 (see FIG. 9) in the vicinity of the application portion C (the predetermined positional relationship is established between the distal end part 131 of the greasing pipe 130 and the application portion C).

This is because the first protruding portions p1a, p1b are provided such that, when the distal end part 131 of the greasing pipe 130 reaches the position P1 (see FIG. 9) in the vicinity of the application portion C along with the introduction operation to introduce the second jig 120 toward the application portion C (when the predetermined positional relationship is established between the distal end part 131 of the greasing pipe 130 and the application portion C), the first protruding portions p1a, p1b are inserted into the first hole 113 (or the second hole 114) (see FIG. 13B) and cause friction (frictional force) between the first hole 113 (or the second hole 114) and the first protruding portions p1a, p1b.

Accordingly, while the operator watches the screen (e.g., the image including the distal end part of the greasing pipe 130 and its surrounding structural object (e.g., the application portion C)) displayed on the display portion 163 attached to the operating portion 162 gripped by the first hand (for example, the right hand), the operator can focus on the introduction operation to introduce the second jig 120 (the insertion portion 121) held by the second hand (e.g., the left hand) toward the application portion C in the direction of the arrow AR5 so that the distal end part 131 of the greasing pipe 130 reaches the position P1 (see FIG. 9) in the vicinity of the application portion C.

Further, the third embodiment yields the following advantage. That is, as described above, when the first protruding portions p1a, p1b are inserted into the first hole 113 (or the second hole 114), the second jig 120 is fixed to the first jig 110 by the friction caused between the first protruding portions p1a, p1b and the inner wall of the first hole 113 (or the second hole 114). Further, a gap (clearance) between the insertion portion 121 of the second jig 120 inserted into the first hole 113 (or the second hole 114) and the inner wall of the first hole 113 (or the second hole 114) is around 0.5 mm.

Accordingly, in a case where the friction is caused, even when the operator takes the hand off the second jig 120, the position of the distal end part 131 of the greasing pipe 130 relative to the application portion C does not change (hardly changes).

Accordingly, when the friction is caused, that is, when the distal end part 131 of the greasing pipe 130 reaches the position P1 (see FIG. 9) in the vicinity of the application portion C, the operator takes off the second hand (e.g., the left hand) off the second jig 120 and newly grips and operates the greasing tool 150 by the second hand (e.g., the left hand) (e.g., to push the pushing rod 152 illustrated in FIG. 3 in the axial direction), so that grease can be supplied to the application portion C from the opening 131a of the greasing pipe 130. That is, a single operator can perform the introduction operation to introduce the second jig 120 toward the application portion C, and its subsequent operation to supply the grease to the application portion C from the opening 131a of the greasing pipe 130. This improves working efficiency.

Fourth Embodiment

Next will be described an insertion amount grasping device 100C according to a fourth embodiment.

Figure 14A:
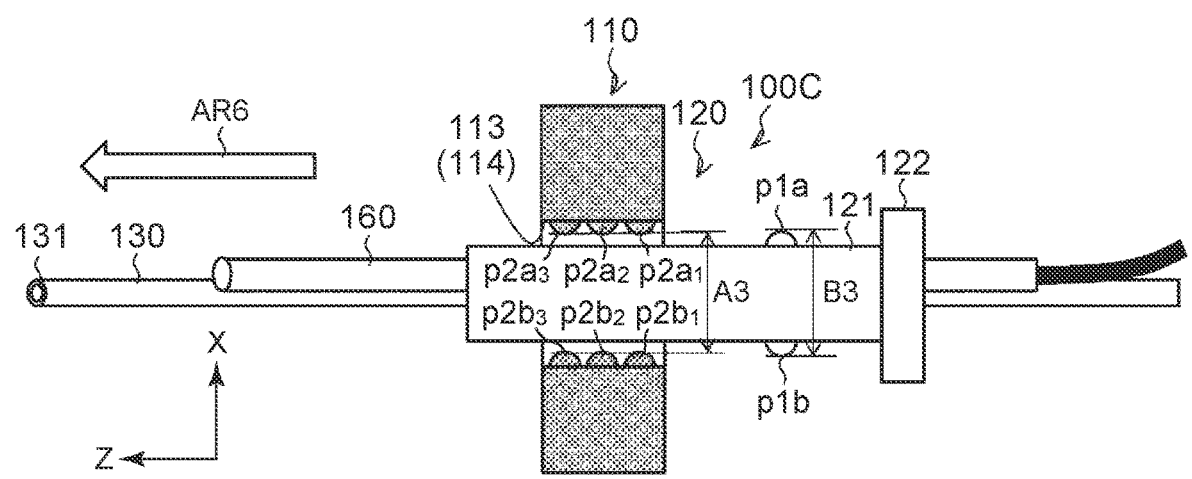
FIG. 14A is a schematic view of an insertion amount grasping device of a fourth embodiment.
Figure 14B:
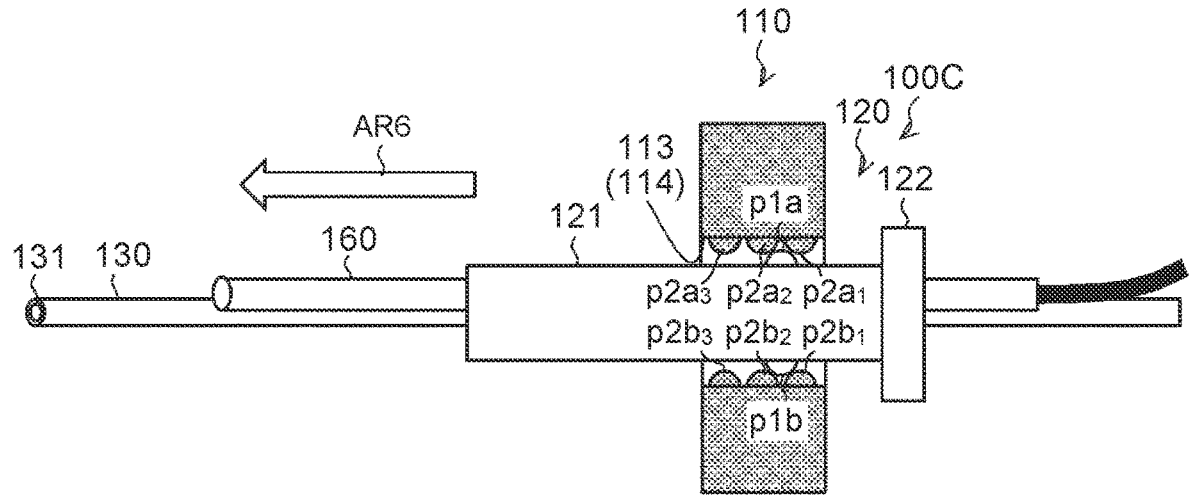
FIG. 14B is a schematic view of the insertion amount grasping device of the fourth embodiment.
Figure 14C:
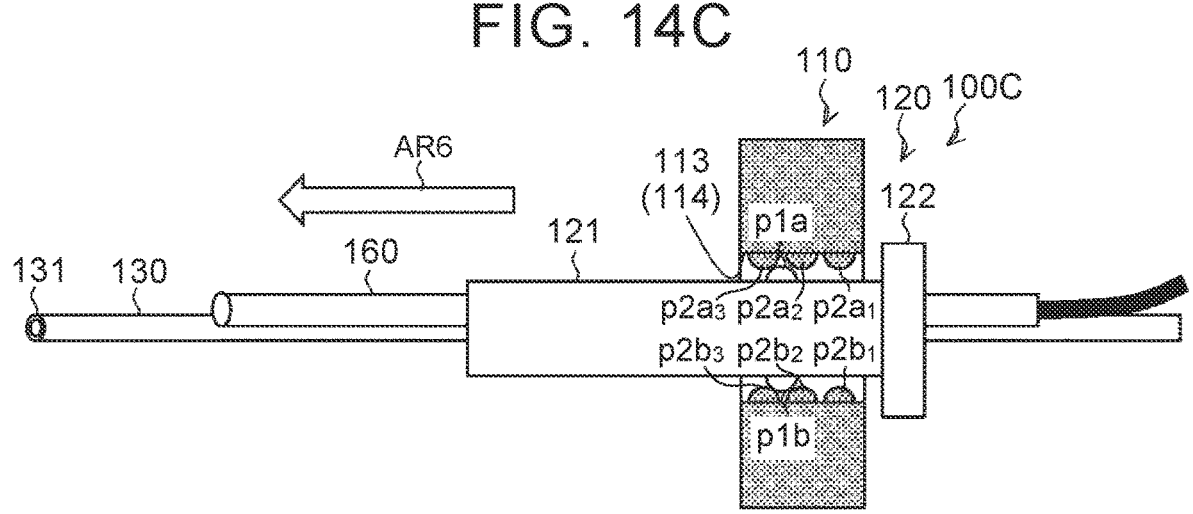
FIG. 14C is a schematic view of the insertion amount grasping device of the fourth embodiment.

FIGS. 14A to 14C are schematic views of the insertion amount grasping device of the fourth embodiment. FIGS. 14A to 14C sequentially illustrate a state where the second jig 120 is inserted into the first jig 110.

The insertion amount grasping device 100C is a device for the operator to grasp, by hand (the sensation in the hand gripping the second jig 120) without visual inspection, that the distal end part 131 of the greasing pipe 130 reaches the position P2 (see FIG. 9) before the application portion C by a predetermined distance or the position P1 (see FIG. 9) in the vicinity of the application portion C (a predetermined positional relationship is established between the distal end part 131 of the greasing pipe 130 and the application portion C).

The insertion amount grasping device 100C has a configuration similar to that of the greasing device 100 in the first embodiment. However, the insertion amount grasping device 100C is different from the greasing device 100 in the first embodiment in that the first protruding portions p1a, p1b are provided in the insertion portion 121 of the second jig 120, and second protruding portions p2a (p2a1, p2a2, p2a3), p2b (p2b1, p2b2, p2b3) are provided on the inner wall of the first hole 113 (and the second hole 114) formed in the first jig 110.

The following description describes mainly points different from the first embodiment. A constituent identical with a constituent described in the first embodiment has the same reference sign as the constituent described in the first embodiment, and a description thereof is omitted appropriately. In the following description, as described in the first embodiment, the first jig 110 is fixed to the clutch housing 30 (the peripheral part of the through-hole 31) in a state where the first jig 110 is positioned against the clutch housing 30 in terms of the X-direction, the Y-direction, and the Z-direction.

At least one of the first jig 110 and the second jig 120 is made of resin. In a case where either one of the first jig 110 and the second jig 120 is made of resin, the other of them may be made of resin or may be made of metal.

As illustrated in FIG. 14A, the insertion portion 121 of the second jig 120 is inserted into the first hole 113 (or the second hole 114) formed in the first jig 110 and is introduced toward the application portion C (see FIG. 9) in a direction of an arrow AR6 in a state where the operator grips the second jig 120. Along with the introduction operation to introduce the second jig 120 toward the application portion C, the distal end part 131 of the greasing pipe 130 reaches the position P2 (see FIG. 9) before the application portion C by the predetermined distance, or the distal end part 131 of the greasing pipe 130 reaches the position P1 (see FIG. 9) in the vicinity of the application portion C.

In order to grasp, by hand (the sensation in the hand gripping the second jig 120) without visual inspection, that the distal end part 131 of the greasing pipe 130 reaches the position P2 (see FIG. 9) before the application portion C by the predetermined distance or the distal end part 131 of the greasing pipe 130 reaches the position P1 (see FIG. 9) in the vicinity of the application portion C (the predetermined positional relationship is established between the distal end part 131 of the greasing pipe 130 and the application portion C), the first protruding portion p1a, p1b are provided in the insertion portion 121 of the second jig 120. Further, the second protruding portions p2a (p2a1, p2a2, p2a3), p2b (p2b1, p2b2, p2b3) are provided on the inner wall of the first hole 113 (and the second hole 114) formed in the first jig 110.

The first protruding portions p1a, p1b and the second protruding portions p2a (p2a1, p2a2, p2a3), p2b (p2b1, p2b2, p2b3) are semi-spherical protruding portions, for example. Note that the first protruding portions p1a, p1b and the second protruding portions p2a (p2a1, p2a2, p2a3), p2b (p2b1, p2b2, p2b3) are not limited to the semi-spherical protruding portions and may be protruding portions having other shapes.

The first protruding portions p1a, p1b are provided at a position (see FIGS. 14B, 14C) where the first protruding portions p1a, p1b are inserted into the first hole 113 (or the second hole 114) when the distal end part 131 of the greasing pipe 130 reaches the position P2 (see FIG. 9) before the application portion C by the predetermined distance or the distal end part 131 of the greasing pipe 130 reaches the position P1 (see FIG. 9) in the vicinity of the application portion C along with the introduction operation to introduce the second jig 120 toward the application portion C.

The second protruding portions p2a (p2a1, p2a2, p2a3), p2b (p2b1, p2b2, p2b3) are placed in line along the introduction direction (see an arrow AR6 in FIG. 14) of the second jig 120.

Along with the introduction operation to introduce the second jig 120 toward the application portion C, the first protruding portions p1a, p1b cause friction between the first protruding portions p1a, p1b and the second protruding portions p2a (p2a1, p2a2, p2a3), p2b (p2b1, p2b2, p2b3) and pass across the second protruding portions p2a (p2a1, p2a2, p2a3), p2b (p2b1, p2b2, p2b3).

In order to cause this friction, as illustrated in FIG. 14A, a diameter A3 (a design dimension) of the first hole 113 (and the second hole 114) including the second protruding portions p2a (p2a1, p2a2, p2a3), p2b (p2b1, p2b2, p2b3) and a thickness B3 (a design dimension) of the insertion portion 121 of the second jig 120 including the first protruding portions p1a, p1b are set to establish a relationship of A3<B3.

Accordingly, the operator can grasp, by hand (the sensation in the hand gripping the second jig 120) without visual inspection, that the distal end part 131 of the greasing pipe 130 reaches the position P2 (see FIG. 9) before the application portion C by the predetermined distance or the distal end part 131 of the greasing pipe 130 reaches the position P1 (see FIG. 9) in the vicinity of the application portion C along with the introduction operation to introduce the second jig 120 toward the application portion C. For example, when the first protruding portions p1a, p1b abut with (are pressed against) the second protruding portions p2a1, p2b1 and pass across the second protruding portions p2a1, p2b1 along with the introduction operation to introduce the second jig 120 toward the application portion C, the operator can grasp that the distal end part 131 of the greasing pipe 130 reaches the position P2 (see FIG. 9) before the application portion C by the predetermined distance (the operator can grasp the friction), by hand (the sensation in the hand gripping the second jig 120) without visual inspection. Further, when the first protruding portions p1a, p1b abut with (are pressed against) the second protruding portions p2a2, p2b2 and pass across the second protruding portions p2a2, p2b2 along with the introduction operation to further introduce the second jig 120 toward the application portion C, the operator can grasp that the distal end part 131 of the greasing pipe 130 reaches the position P1 (see FIG. 9) in the vicinity of the application portion C (the operator can grasp the friction), by hand (the sensation in the hand gripping the second jig 120) without visual inspection.

As described above, with the fourth embodiment, it is possible to grasp, by hand (the sensation in the hand gripping the second jig 120) without visual inspection, that the distal end part 131 of the greasing pipe 130 reaches the position P1 (see FIG. 9) in the vicinity of the application portion C (the predetermined positional relationship is established between the distal end part 131 of the greasing pipe 130 and the application portion C).

This is because the first protruding portions p1a, p1b and the second protruding portions p2a (p2a1, p2a2, p2a3), p2b (p2b1, p2b2, p2b3) are provided such that they cause friction (frictional force) when the distal end part 131 of the greasing pipe 130 reaches the position P2 (see FIG. 9) before the application portion C by the predetermined distance or the distal end part 131 of the greasing pipe 130 reaches the position P1 (see FIG. 9) in the vicinity of the application portion C (the predetermined positional relationship is established between the distal end part 131 of the greasing pipe 130 and the application portion C) along with the introduction operation to introduce the second jig 120 toward the application portion C.

Accordingly, while the operator watches the screen (e.g., the image including the distal end part of the greasing pipe 130 and its surrounding structural object (e.g., the application portion C)) displayed on the display portion 163 attached to the operating portion 162 gripped by the first hand (for example, the right hand), the operator can focus on the introduction operation to introduce the second jig 120 (the insertion portion 121) gripped by the second hand (e.g., the left hand) toward the application portion C in the direction of the arrow AR6 so that the distal end part 131 of the greasing pipe 130 reaches the position P2 (see FIG. 9) before the application portion C by the predetermined distance or the distal end part 131 of the greasing pipe 130 reaches the position P1 (see FIG. 9) in the vicinity of the application portion C.

Further, the fourth embodiment yields the following advantage. That is, when the distal end part 131 of the greasing pipe 130 reaches the position P1 (see FIG. 9) in the vicinity of the application portion C, and the first protruding portions p1a, p1b are inserted into the first hole 113 (or the second hole 114) (see FIG. 14C) as described above, the second jig 120 is fixed to the first jig 110. Further, a gap (clearance) between the insertion portion 121 of the second jig 120 inserted into the first hole 113 (or the second hole 114) and the inner wall of the first hole 113 (or the second hole 114) is around 0.5 mm.

Accordingly, in a case where the distal end part 131 of the greasing pipe 130 reaches the position P1 (see FIG. 9) in the vicinity of the application portion C, and the first protruding portions p1a, p1b are inserted into the first hole 113 (or the second hole 114) (see FIG. 14C), even when the operator takes the hand off the second jig 120, the position of the distal end part 131 of the greasing pipe 130 relative to the application portion C does not change (hardly changes).

On this account, when the distal end part 131 of the greasing pipe 130 reaches the position P1 (see FIG. 9) in the vicinity of the application portion C, the operator takes off the second hand (e.g., the left hand) off the second jig 120 and newly grips and operates the greasing tool 150 by the second hand (e.g., the left hand) (e.g., to push the pushing rod 152 illustrated in FIG. 3 in its axial direction), so that grease can be supplied to the application portion C from the opening 131a of the greasing pipe 130. That is, a single operator can perform the introduction operation to introduce the second jig 120 toward the application portion C and its subsequent operation to supply the grease to the application portion C from the opening 131a of the greasing pipe 130. This improves working efficiency.

Further, the fourth embodiment yields the following advantage. That is, different vehicle types (different manual transmission units) may require different necessary insertion amounts (strokes) until the distal end part 131 of the greasing pipe 130 reaches the vicinity of the application portion C. In this case, for each of the different vehicle types (manual transmission units) that require different necessary insertion amounts, corresponding second protruding portions p2a (p2a1, p2a2, p2a3), p2b (p2b1, p2b2, p2b3) are placed such that friction (frictional force) is caused when the distal end part 131 of the greasing pipe 130 reaches the vicinity of the application portion C. Hereby, it is possible to perform greasing by use of a single first jig 110 on the different vehicle types (the different manual transmission units) that requires different necessary insertion amounts. That is, it is not necessary to prepare different first jigs 110 for respective vehicle types (respective manual transmission units), thereby making it possible to restrain an increase in the number of types of the first jig 110 and an increase in investment (cost) along with that.

Figure 15:
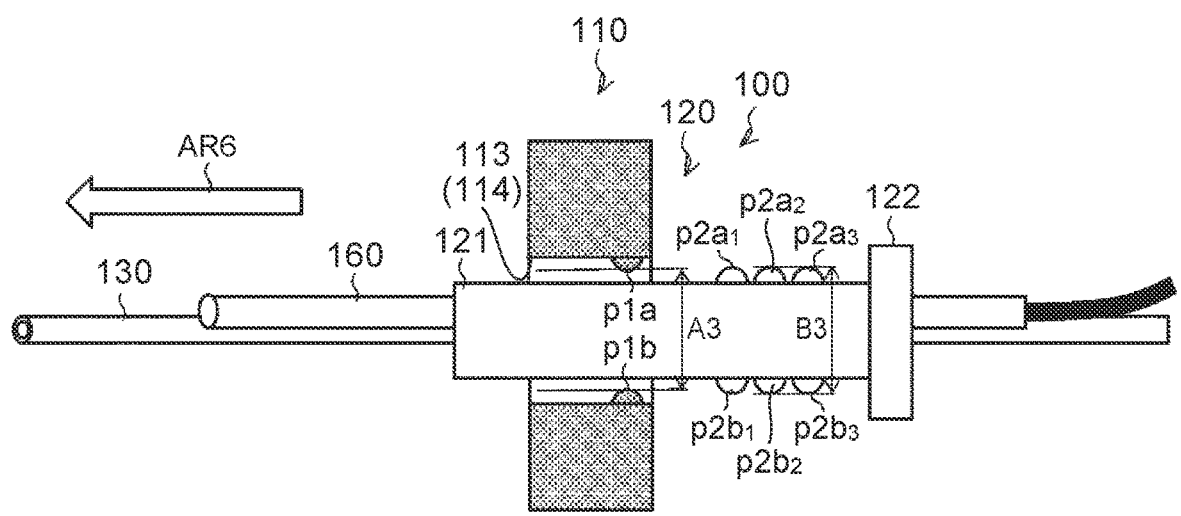
FIG. 15 is a schematic view of an insertion amount grasping device (a modification) of the fourth embodiment.

Next will be described a modification. FIG. 15 is a schematic view of an insertion amount grasping device (a modification) of the fourth embodiment.

As illustrated in FIG. 14A, the fourth embodiment deals with an example in which the first protruding portions p1a, p1b are provided in the insertion portion 121 of the second jig 120, and the second protruding portions p2a (p2a1, p2a2, p2a3), p2b (p2b1, p2b2, p2b3) are provided on the inner wall of the first hole 113 (and the second hole 114) formed in the first jig 110.

For example, as illustrated in FIG. 15, in a reverse manner to the above, the second protruding portions p2a (p2a1, p2a2, p2a3), p2b (p2b1, p2b2, p2b3) may be provided in the insertion portion 121 of the second jig 120, and the first protruding portion p1a, p1b may be provided on the inner wall of the first hole 113 (and the second hole 114) formed in the first jig 110.

Further, the fourth embodiment deals with an example in which three second protruding portions p2a (p2a1, p2a2, p2a3), p2b (p2b1, p2b2, p2b3) are provided on each side, but the present disclosure is not limited to this. For example, four or more second protruding portions p2a, p2b may be provided on each side, for example.

Next will be described modifications of the first to fourth embodiments.

The first to fourth embodiments deal with an example in which grease is used as the hydraulic substance, but the present disclosure is not limited to this. For example, fluid may be used as the hydraulic substance. In this case, the application portion C is a part that requires supply of the fluid. Further, as the hydraulic substance, hydraulic substances other than the grease and the fluid may be used.

Further, the third and fourth embodiments deal with an example in which the first protruding portions p1a, p1b are provided in the insertion portion 121 of the second jig 120, but the present disclosure is not limited to this. For example, in a case where the second jig 120 is omitted, the first protruding portions p1a, p1b may be provided in the greasing pipe 130.

Further, the first to fourth embodiments deal with an example in which the greasing pipe 130 is provided in the second jig 120, but the present disclosure is not limited to this. For example, the greasing pipe 130 may be omitted. In this case, it is possible to perform narrow-space inspection by use of the endoscope 160. In this case, the application portion C is a part that requires the narrow-space inspection. Further, the first to fourth embodiments deal with an example in which the endoscope 160 is provided in the second jig 120, but the present disclosure is not limited to this. For example, the endoscope 160 may be omitted.

Further, the first to fourth embodiments deal with an example in which the insertion amount grasping device of the present disclosure is applied to the field of vehicles (grease emission maintenance for a clutch release mechanism), but the present disclosure is not limited to this. For example, the insertion amount grasping device of the present disclosure may be applied to various fields such as the medical field other than the field of vehicles. For example, the first to fourth embodiments deal with an example in which the fixation target is the clutch housing 30 (the peripheral part of the through-hole 31), but the present disclosure is not limited to this. That is, a fixation target suitable for the field to which the insertion amount grasping device of the present disclosure is applied may be used as the fixation target. Similarly, the first to fourth embodiments deal with an example in which the clutch housing 30 is used as the cover member, but the present disclosure is not limited to this. That is, a cover member suitable for the field to which the insertion amount grasping device of the present disclosure is applied may be used as the cover member.

All values exhibited in the embodiments are just examples, and it is natural that appropriate values different from those values can be used.

The embodiments are just examples in every respect. The present disclosure should not be interpreted restrictively by the descriptions of the embodiments. The present disclosure can be carried out in other various forms without departing from the spirit or main feature of the present disclosure.

What is claimed is:

1. An insertion amount grasping device comprising:
   a first jig fixed to a fixation target in a state where the first jig is positioned against the fixation target, the first jig having a guide through-hole extending toward an application portion in a state where the first jig is fixed to the fixation target;
   an insertion portion configured to be inserted into the guide through-hole such that the insertion portion is introduced toward the application portion in a state where an operator grips the insertion portion; and
   a first protruding portion as a protruding portion provided in the insertion portion, the first protruding portion being configured to be inserted into the guide through-hole and cause friction between the first protruding portion and the guide through-hole when a predetermined positional relationship is established between a distal end part of the insertion portion and the application portion along with an introduction operation to introduce the insertion portion toward the application portion.

2. The insertion amount grasping device according to claim 1, wherein a diameter of the guide through-hole and a thickness of the insertion portion including the first protruding portion are set to establish a relationship that the diameter of the guide through-hole is smaller than the thickness of the insertion portion including the first protruding portion.

3. The insertion amount grasping device according to claim 1, wherein:
   at least one second protruding portion is provided on an inner wall of the guide through-hole; and
   along with the introduction operation to introduce the insertion portion toward the application portion, the first protruding portion causes friction between the first protruding portion and the second protruding portion and passes across the second protruding portion.

4. The insertion amount grasping device according to claim 3, wherein a diameter of the guide through-hole including the second protruding portion and a thickness of the insertion portion including the first protruding portion are set to establish a relationship that the diameter of the guide through-hole including the second protruding portion is smaller than the thickness of the insertion portion including the first protruding portion.

5. The insertion amount grasping device according to claim 1, wherein:
   the fixation target is a cover member;
   the application portion is placed in an internal space surrounded by the cover member;
   a jig fixation through-hole communicating with the internal space is formed in the cover member;
   the first jig includes an engageable portion configured to engage with a peripheral part of the jig fixation through-hole in the cover member in a state where the first jig is positioned against the cover member; and
   the first jig is fixed to the cover member such that the engageable portion engages with the peripheral part of the jig fixation through-hole in the cover member.

6. The insertion amount grasping device according to claim 1, wherein:
   the insertion portion is an elongated emission portion having a distal end part from which a hydraulic substance is emitted, or a second jig including the emission portion; and
   the insertion portion is inserted into the guide through-hole such that the insertion portion is introduced toward the application portion in a state where the operator grips the insertion portion.

7. The insertion amount grasping device according to claim 6, wherein the insertion portion further includes an imaging portion configured to capture an image including the distal end part of the emission portion and the application portion.

8. The insertion amount grasping device according to claim 6, wherein:
   the application portion is a part that requires supply of grease or fluid; and
   the hydraulic substance is the grease or the fluid.

9. The insertion amount grasping device according to claim 1, wherein:
   the insertion portion is a second jig including an elongated imaging device having a distal end part in which an imaging portion is provided, the imaging portion being configured to capture an image including the application portion; and
   the insertion portion is inserted into the guide through-hole such that the insertion portion is introduced toward the application portion in a state where the operator grips the insertion portion.

10. The insertion amount grasping device according to claim 9, wherein the application portion is a part that requires narrow-space inspection.

* * * * *